(12) United States Patent
Kondo et al.

(10) Patent No.: US 11,828,923 B2
(45) Date of Patent: Nov. 28, 2023

(54) IMAGING LENS AND IMAGING APPARATUS

(71) Applicant: FUJIFILM Corporation, Tokyo (JP)

(72) Inventors: Masato Kondo, Saitama (JP); Tetsuya Ori, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 388 days.

(21) Appl. No.: 17/166,677

(22) Filed: Feb. 3, 2021

(65) Prior Publication Data

US 2021/0255442 A1   Aug. 19, 2021

(30) Foreign Application Priority Data

Feb. 18, 2020  (JP) .................... 2020-025588

(51) Int. Cl.
 G02B 15/14   (2006.01)
 G02B 27/00   (2006.01)
 G02B 15/20   (2006.01)

(52) U.S. Cl.
 CPC ........... *G02B 15/143* (2019.08); *G02B 15/20* (2013.01); *G02B 27/0025* (2013.01)

(58) Field of Classification Search
 CPC ................................ G02B 15/143; G02B 9/12
 See application file for complete search history.

(56) References Cited

U.S. PATENT DOCUMENTS

| | | |
|---|---|---|
| 2012/0069456 A1 | 3/2012 | Suzuki |
| 2014/0368926 A1 | 12/2014 | Suzuki |
| 2017/0075089 A1 | 3/2017 | Nagami et al. |
| 2018/0372986 A1 | 12/2018 | Maruyama et al. |
| 2019/0384035 A1* | 12/2019 | Nagano .................... G02B 7/10 |

FOREIGN PATENT DOCUMENTS

| | | |
|---|---|---|
| JP | 2006-251529 A | 9/2006 |
| JP | 2012-063676 A | 3/2012 |
| JP | 2013-029658 A | 2/2013 |
| JP | 2015-001641 A | 1/2015 |
| JP | 2017-054078 A | 3/2017 |
| JP | 2019-219481 A | 12/2019 |
| WO | 2017/130571 A1 | 8/2017 |

OTHER PUBLICATIONS

An Office Action; "Notice of Reasons for Refusal," mailed by the Japanese Patent Office dated Jan. 10, 2023, which corresponds to Japanese Patent Application No. 2020-025588 and is related to U.S. Appl. No. 17/166,677; with English language translation.
An Office Action; "Notice of Reasons for Refusal," mailed by the Japanese Patent Office dated Oct. 4, 2022, which corresponds to Japanese Patent Application No. 2020-025588 and is related to U.S. Appl. No. 17/166,677; with English language translation.

* cited by examiner

*Primary Examiner* — Joseph P Martinez
(74) *Attorney, Agent, or Firm* — Studebaker & Brackett PC

(57) ABSTRACT

An imaging lens consists of, in order from the object side, a first lens group, a stop, a positive second lens group, and a third lens group. During focusing, at least the second lens group moves and the third lens group does not move. The second lens group includes at least two negative lenses. The third lens group consists of one negative lens and one positive lens.

20 Claims, 15 Drawing Sheets

EXAMPLE 1

EXAMPLE 2

EXAMPLE 3

EXAMPLE 4

EXAMPLE 5

EXAMPLE 6

EXAMPLE 7

IMAGING LENS AND IMAGING APPARATUS

CROSS-REFERENCE TO RELATED APPLICATIONS

The present application claims priority under 35 U.S.C. § 119 to Japanese Patent Application No. 2020-025588, filed on Feb. 18, 2020. The above application is hereby expressly incorporated by reference, in its entirety, into the present application.

BACKGROUND OF THE INVENTION

1. Field of the Invention

The present disclosure relates to an imaging lens and an imaging apparatus.

2. Description of the Related Art

Conventionally, a lens system described in JP2013-029658A below is known as an imaging lens used in a digital camera or the like.

SUMMARY OF THE INVENTION

In recent years, there has been a demand for an imaging lens having a short total length of the lens system and favorable optical performance.

The present disclosure has been made in view of the above circumstances, and an object of the present disclosure is to provide an imaging lens, which is capable of achieving reduction in total length of the lens system and has favorable optical performance, and an imaging apparatus comprising the imaging lens.

A imaging lens according to an aspect of the present disclosure consists of, in order from an object side to an image side: a first lens group; a stop; a second lens group having a positive refractive power; and a third lens group. During focusing, at least the second lens group moves along an optical axis, and the third lens group remains stationary with respect to an image plane, the second lens group includes at least two negative lenses, and the third lens group consists of one negative lens and one positive lens.

Assuming that a focal length of the first lens group is f1 and a focal length of the second lens group is f2, it is preferable that the imaging lens according to the aspect of the present disclosure satisfies Conditional Expression (1), and it is more preferable that the imaging lens satisfies Conditional Expression (1-1).

$$-0.5 < f2/f1 < 1 \tag{1}$$

$$-0.3 < f2/f1 < 0.9 \tag{1-1}$$

It is preferable that the second lens group includes at least two positive lenses. In addition, it is preferable that a meniscus lens having a surface concave toward the object side is disposed at a position closest to the image side in the second lens group.

Assuming that a paraxial radius of curvature of an object side surface of a lens closest to the image side in the second lens group is R2rA and a paraxial radius of curvature of an image side surface of the lens closest to the image side in the second lens group is R2rB, it is preferable that the imaging lens according to the aspect of the present disclosure satisfies Conditional Expression (2), and it is more preferable that the imaging lens satisfies Conditional Expression (2-1).

$$-0.3 < (R2rB-R2rA)/(R2rB+R2rA) < 0.3 \tag{2}$$

$$-0.15 < (R2rB-R2rA)/(R2rB+R2rA) < 0.15 \tag{2-1}$$

Assuming that a focal length of the second lens group is f2, and a focal length of a lens closest to the image side in the second lens group is f2R, it is preferable that the imaging lens according to the aspect of the present disclosure satisfies Conditional Expression (3), and it is more preferable that the imaging lens satisfies Conditional Expression (3-1).

$$-0.4 < f2/f2R < 0.6 \tag{3}$$

$$-0.3 < f2/f2R < 0.5 \tag{3-1}$$

It is preferable that the second lens group consists of, in order from the object side to the image side, two sets of cemented lenses and a meniscus lens having a surface concave toward the object side.

It is preferable that the first lens group includes at least one negative lens and at least one positive lens.

It is preferable that the first lens group consists of, in order from the object side to the image side, two negative lenses and one positive lens.

It is preferable that the negative lens of the third lens group has an absolute value of a radius of curvature of an object side surface smaller than an absolute value of a radius of curvature of an image side surface.

It is preferable that the third lens group includes the negative lens and the positive lens arranged in order from the object side to the image side.

Assuming that a focal length of the imaging lens in a state where an object at infinity is in focus is f and a focal length of the first lens group is f1, it is preferable that the imaging lens according to the aspect of the present disclosure satisfies Conditional Expression (4).

$$-0.6 < f/f1 < 1.5 \tag{4}$$

Assuming that a focal length of the imaging lens in a state where an object at infinity is in focus is f and a focal length of the second lens group is f2, it is preferable that the imaging lens according to the aspect of the present disclosure satisfies Conditional Expression (5).

$$0.6 < f/f2 < 1.8 \tag{5}$$

Assuming that a focal length of the imaging lens in a state where an object at infinity is in focus is f and a focal length of the third lens group is f3, it is preferable that the imaging lens according to the aspect of the present disclosure satisfies Conditional Expression (6).

$$-0.8 < f/f3 < 0.4 \tag{6}$$

Assuming that a focal length of the positive lens of the third lens group is f3p and a focal length of the imaging lens in a state where an object at infinity is in focus is f, it is preferable that the imaging lens according to the aspect of the present disclosure satisfies Conditional Expression (7).

$$0.5 < f3p/f < 3 \tag{7}$$

Assuming that a maximum half angle of view of the imaging lens in a state where an object at infinity is in focus is climax, a distance on the optical axis from a lens surface closest to the object side in the third lens group to a lens surface closest to the image side in the third lens group is T3, and a focal length of the imaging lens in a state where an object at infinity is in focus is f, climax is 30 degrees or more and it is preferable that the imaging lens according to the aspect of the present disclosure satisfies Conditional Expression (8).

$$0.2<T3/\{f\times\tan(\omega\ \max)\}1<0.6 \qquad (8)$$

Assuming that a paraxial radius of curvature of an object side surface of the negative lens of the third lens group is R3nA and a paraxial radius of curvature of an image side surface of the negative lens of the third lens group is R3nB, it is preferable that the imaging lens according to the aspect of the present disclosure satisfies Conditional Expression (9).

$$0.2<(R3nB-R3nA)/(R3nB+R3nA)<2 \qquad (9)$$

An imaging apparatus according to another aspect of the present disclosure comprises the imaging lens according the aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

It should be noted that, in the present specification, the term "~ group having a positive refractive power" means that the group has a positive refractive power as a whole. Similarly, the term "~ group having a negative refractive power" means that the group has a negative refractive power as a whole. The terms "a lens having a positive refractive power", "a positive lens", and "a lens with a positive power" are synonymous. The terms "a lens having a negative refractive power", "a negative lens", and "a lens with a negative power" are synonymous. The term "— lens group" is not limited to a configuration consisting of a plurality of lenses, but may consist of only one lens. The term "single lens" means one uncemented lens.

A compound aspheric lens (a lens in which a spherical lens and an aspheric film formed on the spherical lens are integrally formed and function as one aspheric lens as a whole) is not regarded as cemented lenses, but the compound aspheric lens is regarded as a single lens. Unless otherwise specified, the sign of refractive power, the surface shape, and the radius of curvature of a lens including an aspheric surface are considered in terms of the paraxial region. Regarding the sign of the radius of curvature, the sign of the radius of curvature of the surface convex toward the object side is positive and the sign of the radius of curvature of the surface convex toward the image side is negative.

The "focal length" used in a conditional expression is a paraxial focal length. The values used in the conditional expressions are values based on the d line except for the partial dispersion ratio. The "d line", "C line", "F line", and "g line" described in this specification are emission lines. In this specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide an imaging lens, which is capable of achieving reduction in total length of the lens system and has favorable optical performance, and an imaging apparatus comprising the imaging lens.

DESCRIPTION OF THE PREFERRED EMBODIMENTS

Figure 1:
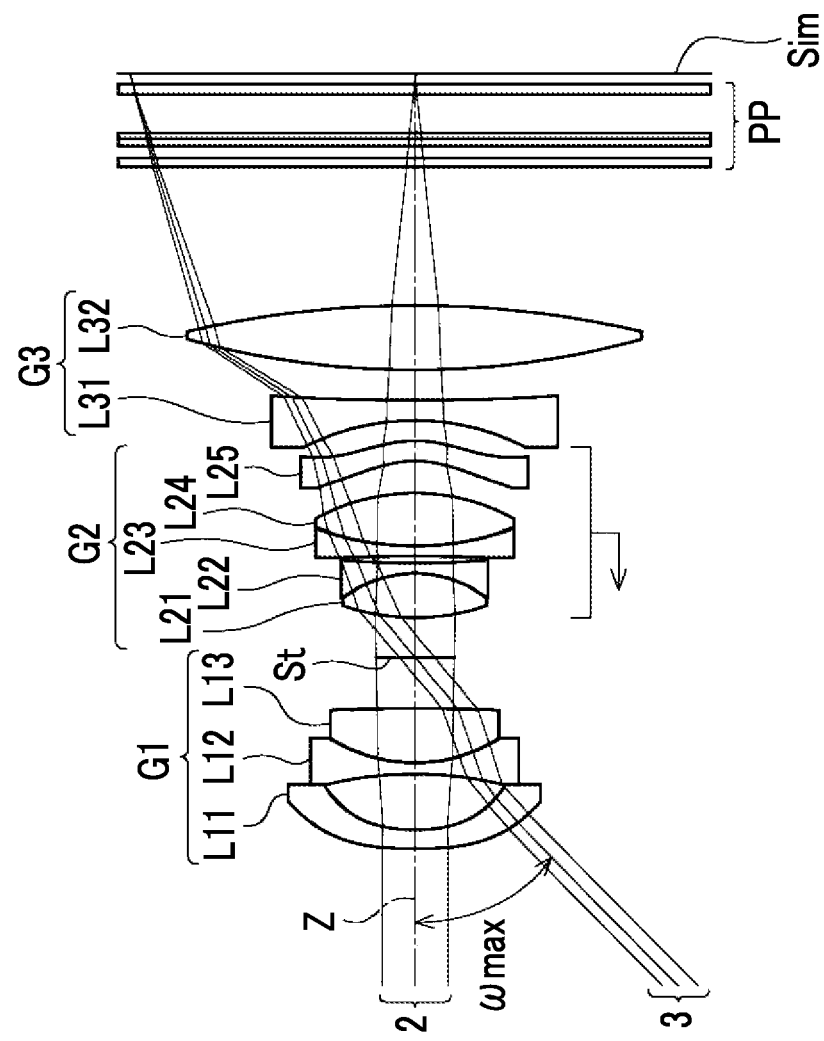
FIG. 1 is a cross-sectional view showing a configuration and rays of an imaging lens according to an embodiment, which corresponds to the imaging lens of Example 1.

Hereinafter, embodiments of the present disclosure will be described in detail with reference to the accompanying drawings. FIG. 1 shows a configuration and rays in a cross section including an optical axis Z of an imaging lens according to an embodiment of the present disclosure. The example shown in FIG. 1 corresponds to the imaging lens of Example 1 to be described later. In FIG. 1, the left side is the object side, the right side is the image side, and a state where an object at infinity is in focus is shown. FIG. 1 also shows on-axis rays 2 and rays with the maximum angle of view 3 as the rays. In the following description, the "imaging lens according to the embodiment of the present disclosure" is also simply referred to as "imaging lens".

FIG. 1 shows an example in which, assuming that an imaging lens is applied to an imaging apparatus, an optical member PP having a parallel plate shape is disposed between the imaging lens and the image plane Sim. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens consists of, in order from the object side to the image side along the optical axis Z, a first lens group G1, an aperture stop St, a second lens group G2, and a third lens group G3. For example, in the imaging lens shown in FIG. 1, the first lens group G1 consists of three lenses L11 to L13 in order from the object side to the image side, the second lens group G2 consists of five lenses L21 to L25 in order from the object side to the image side, and the third lens group G3 consists of two lenses L31 and L32 in order from the object side to the image side.

This imaging lens is configured such that, during focusing from the object at infinity to the closest object, at least the second lens group G2 moves along the optical axis Z, and the third lens group G3 remains stationary with respect to the image plane Sim. FIG. 1 shows an example in which the second lens group G2 moves to the object side during focusing from the object at infinity to the closest object. The arrow pointing to the left below the second lens group G2 shown in FIG. 1 indicates a focus group in which the second lens group G2 moves to the object side during focusing from the object at infinity to the closest object. Hereinafter, the lens group that moves during focusing is referred to as a "focus group".

By making the third lens group G3 remain stationary during focusing, it is possible to suppress fluctuation in field curvature during focusing. Further, in the configuration in which the third lens group G3 remains stationary during focusing, as compared with the configuration in which the entire imaging lens moves during focusing, it is possible to achieve reduction in size and weight of a focus group and mechanical components associated with the focus group. Therefore, there is an advantage in achieving reduction in load on the drive system and an increase in speed of focusing.

FIG. 1 shows an example of the inner-focus-type lens system in which the first lens group G1 remains stationary to the image plane Sim in addition to the third lens group G3 and only the second lens group G2 moves, during focusing from the object at infinity to the closest object. By making the first lens group G1 remain stationary during focusing, it is possible to further reduce the size and weight of the focus group. In addition, the inner-focus-type configuration is also able to obtain dust-proof and drip-proof effects.

The first lens group G1 includes a plurality of lenses each having a refractive power. Specifically, it is preferable that the first lens group G1 includes at least one negative lens and at least one positive lens. Since the first lens group G1 includes both the negative lens and the positive lens, there is an advantage in favorable correction of lateral chromatic aberration.

More specifically, it is preferable that the first lens group G1 consists of, in order from the object side to the image side, two negative lenses and one positive lens. In such a case, it is easy to achieve a wide angle while suppressing occurrence of distortion.

As an example, the first lens group G1 shown in FIG. 1 consists of, in order from the object side to the image side, a negative lens L11, a negative lens L12, and a positive lens L13. The lens L11 is a single lens. The lens L12 and the lens L13 are cemented to each other.

The second lens group G2 is configured to be a lens group having a positive refractive power. By making the refractive power of the second lens group G2 close to the aperture stop St positive, it is easy to give a sufficient refractive power to the entire lens system while suppressing the influence on distortion and astigmatism.

The second lens group G2 is configured to include at least two negative lenses. By making the negative refractive power shared by two or more lenses, it is easy to satisfactorily correct spherical aberration.

Further, it is preferable that the second lens group G2 includes at least two positive lenses. Occurrence of spherical aberration can be suppressed by allowing two or more lenses to share the positive refractive power required for the second lens group G2.

It is preferable that a meniscus lens having a surface concave toward the object side is disposed at a position closest to the image side in the second lens group G2. There is an advantage in balancing astigmatism by forming lens closest to the image side in the second lens group G2 as a meniscus lens having a surface concave toward the object side.

In a case where a meniscus lens having a surface concave toward the object side is disposed at the position closest to the image side in the second lens group G2, it is preferable that at least one of the object side surface or the image side surface of the meniscus lens is an aspheric surface. In such a case, there is an advantage in correcting spherical aberration, suppressing fluctuation in spherical aberration during focusing, and suppressing fluctuation in the field curvature during focusing.

It is preferable that the second lens group G2 consists of, in order from the object side to the image side, two sets of cemented lenses and a meniscus lens having a surface concave toward the object side. In such a case, it is easy to balance longitudinal chromatic aberration, lateral chromatic aberration, spherical aberration, and field curvature, while adopting a simple configuration.

As an example, the second lens group G2 shown in FIG. 1 consists of, in order from the object side to the image side, a positive lens L21, a negative lens L22, a negative lens L23, a positive lens L24, and a negative lens L25. The lens L21 and the lens L22 are cemented to each other. The lens L23 and the lens L24 are cemented to each other. The lens L25 is an aspheric lens and is a meniscus lens having a surface concave toward the object side in the paraxial region.

The third lens group G3 consists of one negative lens and one positive lens. According to such a configuration, there is an advantage in favorable correction of lateral chromatic aberration and distortion. In addition, since the total number of lenses in the third lens group G3 is limited to two, the total length of the lens system can be reduced. Therefore, there is an advantage in achieving reduction in thickness of the optical system.

It is preferable that the third lens group G3 includes the negative lens and the positive lens arranged in order from the object side to the image side. By arranging the negative lens and the positive lens in this order from the object side, it is easy to reduce the incident angle of the principal ray on the image plane Sim.

It is preferable that a negative lens of the third lens group G3 has an absolute value of a radius of curvature of an object side surface smaller than an absolute value of a radius of curvature of an image side surface. In such a case, it is possible to suppress occurrence of astigmatism.

Next, conditional expressions that the imaging lens preferably satisfies will be described. However, the conditional expressions that the imaging lens preferably satisfies are not limited to the conditional expressions described in the form of the expression, and the lower limit and the upper limit are selected from the preferable, more preferable, and yet more preferable conditional expressions. The conditional expressions may include all conditional expressions obtained through optional combinations.

Assuming that the focal length of the first lens group G1 is f1 and the focal length of the second lens group G2 is f2, it is preferable that the imaging lens satisfies Conditional Expression (1). By not allowing the corresponding value of Conditional Expression (1) to be equal to or less than the lower limit, there is an advantage in achieving reduction in total length of the lens system. By not allowing the corresponding value of Conditional Expression (1) to be equal to or greater than the upper limit, there is an advantage in ensuring the back focal length. In order to obtain more favorable characteristics, it is more preferable that the imaging lens satisfies Conditional Expression (1-1), and it is yet more preferable that the imaging lens satisfies Conditional Expression (1-2).

$$-0.5 < f2/f1 < 1 \quad (1)$$

$$-0.3 < f2/f1 < 0.9 \quad (1-1)$$

$$-0.2 < f2/f1 < 0.8 \quad (1-2)$$

Assuming that a paraxial radius of curvature of an object side surface of the lens closest to the image side in the second lens group G2 is R2rA and a paraxial radius of curvature of an image side surface of the lens closest to the image side in the second lens group G2 is R2rB, it is preferable that the imaging lens satisfies Conditional Expression (2). By not allowing the corresponding value of Conditional Expression (2) to be equal to or less than the lower limit, it is possible to suppress occurrence of astigmatism. By not allowing the corresponding value of Conditional Expression (2) to be equal to or greater than the upper limit, there is an advantage in correcting spherical aberration. In order to obtain more favorable characteristics, it is more preferable that the imaging lens satisfies Conditional Expression (2-1), and it is yet more preferable that the imaging lens satisfies Conditional Expression (2-2).

$$-0.3 < (R2rB - R2rA)/(R2rB + R2rA) < 0.3 \quad (2)$$

$$-0.15 < (R2rB - R2rA)/(R2rB + R2rA) < 0.15 \quad (2-1)$$

$$-0.1 < (R2rB - R2rA)/(R2rB + R2rA) < 0.1 \quad (2-2)$$

Assuming that the focal length of the second lens group G2 is f2 and the focal length of the lens closest to the image side in the second lens group G2 is f2R, it is preferable that the imaging lens satisfies Conditional Expression (3). By not allowing the corresponding value of Conditional Expression (3) within the range of Conditional Expression (3), it is possible to suppress occurrence of lateral chromatic aberration. In order to obtain more favorable characteristics, it is more preferable that the imaging lens satisfies Conditional Expression (3-1), and it is yet more preferable that the imaging lens satisfies Conditional Expression (3-2).

$$-0.4 < f2/f2R < 0.6 \quad (3)$$

$$-0.3 < f2/f2R < 0.5 \quad (3-1)$$

$$-0.2 < f2/f2R < 0.4 \quad (3-2)$$

Assuming that a focal length of the imaging lens in the state where the object at infinity is in focus is f and a focal length of the first lens group G1 is f1, it is preferable that the imaging lens satisfies Conditional Expression (4). By not allowing the corresponding value of Conditional Expression (4) to be equal to or less than the lower limit, there is an advantage in achieving reduction in total length of the lens system. By not allowing the corresponding value of Conditional Expression (4) to be equal to or greater than the upper limit, there is an advantage in achieving a wide angle. In order to obtain more favorable characteristics, it is more preferable that the imaging lens satisfies Conditional Expression (4-1), and it is yet more preferable that the imaging lens satisfies Conditional Expression (4-2).

$$-0.6 < f/f1 < 1.5 \quad (4)$$

$$-0.4 < f/f1 < 1.1 \quad (4-1)$$

$$-0.2 < f/f1 < 0.88 \quad (4-2)$$

Assuming that a focal length of the imaging lens in the state where the object at infinity is in focus is f and a focal length of the second lens group G2 is f2, it is preferable that the imaging lens satisfies Conditional Expression (5). By not allowing the corresponding value of Conditional Expression (5) to be equal to or less than the lower limit, it is possible to reduce the amount of movement of the second lens group G2 during focusing. Thereby, there is an advantage in achieving reduction in total length of the lens system. By not allowing the corresponding value of Conditional Expression (5) to be equal to or greater than the upper limit, it is possible to suppress fluctuations in spherical aberration and field curvature during focusing. In order to obtain more favorable characteristics, it is more preferable that the imaging lens satisfies Conditional Expression (5-1), and it is yet more preferable that the imaging lens satisfies Conditional Expression (5-2).

$$0.6 < f/f2 < 1.8 \quad (5)$$

$$0.8 < f/f2 < 1.6 \quad (5-1)$$

$$0.9 < f/f2 < 1.4 \quad (5-2)$$

Assuming that a focal length of the imaging lens in the state where the object at infinity is in focus is f and a focal length of the third lens group G3 is f3, it is preferable that the imaging lens satisfies Conditional Expression (6). By not allowing the corresponding value of Conditional Expression (6) to be equal to or less than the lower limit, it is easy to reduce the incident angle of the principal ray on the image plane Sim. By not allowing the corresponding value of Conditional Expression (6) to be equal to or greater than the upper limit, it is possible to set a stronger positive refractive power on the object side in the imaging lens. Therefore, there is an advantage in achieving reduction in total length of the lens system. In order to obtain more favorable characteristics, it is more preferable that the imaging lens satisfies Conditional Expression (6-1), and it is yet more preferable that the imaging lens satisfies Conditional Expression (6-2).

$$-0.8 < f/f3 < 0.4 \quad (6)$$

$$-0.6 < f/f3 < 0.2 \quad (6-1)$$

$$-0.5 < f/f3 < 0.1 \quad (6-2)$$

Assuming that a focal length of the positive lens of the third lens group G3 is f3p and a focal length of the imaging lens in a state where an object at infinity is in focus is f, it is preferable that the imaging lens satisfies Conditional Expression (7). By not allowing the corresponding value of Conditional Expression (7) to be equal to or less than the lower limit, it is possible to suppress occurrence of distortion. By not allowing the corresponding value of Conditional Expression (7) to be equal to or greater than the upper limit, it is easy to reduce the incident angle of the principal ray on the image plane Sim. In order to obtain more favorable characteristics, it is more preferable that the imaging lens satisfies Conditional Expression (7-1), and it is yet more preferable that the imaging lens satisfies Conditional Expression (7-2).

$$0.5<f3p/f<3 \tag{7}$$

$$0.6<f3p/f<2 \tag{7-1}$$

$$0.8<f3p/f<1.8 \tag{7-2}$$

Assuming that a maximum half angle of view of the imaging lens in a state where an object at infinity is in focus is climax, a distance on the optical axis from a lens surface closest to the object side in the third lens group G3 to a lens surface closest to the image side in the third lens group G3 is T3, and a focal length of the imaging lens in a state where an object at infinity is in focus is f, climax is 30 degrees or more and it is preferable that the imaging lens satisfies Conditional Expression (8). By setting climax to 30 degrees or more, it is easy to achieve a wide angle. In order to achieve a wider angle, climax is more preferably 34 degrees or more, and yet more preferably 35 degrees or more. By not allowing the corresponding value of Conditional Expression (8) to be equal to or less than the lower limit, it is easy to balance astigmatism, distortion, and lateral chromatic aberration at a low angle of view and a high angle of view. By not allowing the corresponding value of Conditional Expression (8) to be equal to or greater than the upper limit, the distance between the second lens group G2 that moves during focusing and the image plane Sim can be reduced with respect to the maximum image height. Therefore, it is possible to reduce the total length of the lens system and to increase the amount of movement of the focus group during focusing. As a result, it is possible to suppress fluctuations in spherical aberration and field curvature during focusing. In order to obtain more favorable characteristics, it is more preferable that the imaging lens satisfies Conditional Expression (8-1), and it is yet more preferable that the imaging lens satisfies Conditional Expression (8-2).

$$0.2<T3/\{f\times\tan(\omega \max)\}1<0.6 \tag{8}$$

$$0.24<T3/\{f\times\tan(\omega \max)\}<0.5 \tag{8-1}$$

$$0.26<T3/\{f\times\tan(\omega \max)\}<0.45 \tag{8-2}$$

Assuming that a paraxial radius of curvature of an object side surface of the negative lens of the third lens group G3 is R3nA and a paraxial radius of curvature of an image side surface of the negative lens of the third lens group G3 is R3nB, it is preferable that the imaging lens satisfies Conditional Expression (9). By not allowing the corresponding value of Conditional Expression (9) to be equal to or less than the lower limit, it is possible to suppress occurrence of spherical aberration. By not allowing the corresponding value of Conditional Expression (9) to be equal to or greater than the upper limit, it is possible to suppress occurrence of distortion. In order to obtain more favorable characteristics, it is more preferable that the imaging lens satisfies Conditional Expression (9-1), and it is yet more preferable that the imaging lens satisfies Conditional Expression (9-2).

$$0.2<(R3nB-R3nA)/(R3nB+R3nA)<2 \tag{9}$$

$$0.4<(R3nB-R3nA)/(R3nB+R3nA)<1.6 \tag{9-1}$$

$$0.5<(R3nB-R3nA)/(R3nB+R3nA)<1.4 \tag{9-2}$$

Assuming that a distance on the optical axis from the lens surface closest to the object side in the third lens group G3 to the lens surface closest to the image side in the third lens group G3 is T3 and a back focal length of the imaging lens at the air conversion distance is Bf, it is preferable that the imaging lens satisfies Conditional Expression (10). The "back focal length at the air conversion distance" is the air conversion distance on the optical axis from the lens surface closest to the image side to the image side focal position of the imaging lens. By not allowing the corresponding value of Conditional Expression (10) to be equal to or less than the lower limit, it is easy to balance astigmatism, distortion, and lateral chromatic aberration at a low angle of view and a high angle of view. By not allowing the corresponding value of Conditional Expression (10) to be equal to or greater than the upper limit, the distance between the second lens group G2 that moves during focusing and the image plane Sim can be reduced with respect to the back focal length. Thus, it is possible to reduce the total length of the lens system and to increase the amount of movement of the focus group during focusing. As a result, it is possible to suppress fluctuations in spherical aberration and field curvature during focusing. In order to obtain more favorable characteristics, it is more preferable that the imaging lens satisfies Conditional Expression (10-1), and it is yet more preferable that the imaging lens satisfies Conditional Expression (10-2).

$$0.15<T3/Bf<0.8 \tag{10}$$

$$0.2<T3/Bf<0.7 \tag{10-1}$$

$$0.4<T3/Bf<0.65 \tag{10-2}$$

Assuming that a paraxial radius of curvature of the image side surface of the lens which is second from the image side of the second lens group G2 is R2sB, and a distance on the optical axis from the aperture stop St to the image side surface of the lens which is second from the image side of the second lens group G2 is S2sB, it is preferable that the imaging lens satisfies Conditional Expression (11). By not allowing the corresponding value of Conditional Expression (11) within the range of Conditional Expression (11), it is possible to suppress occurrence of astigmatism. In order to obtain more favorable characteristics, it is more preferable that the imaging lens satisfies Conditional Expression (11-1), and it is yet more preferable that the imaging lens satisfies Conditional Expression (11-2).

$$0.7<-R2sB/S2sB<1.7 \tag{11}$$

$$0.8<-R2sB/S2sB<1.5 \tag{11-1}$$

$$0.85<-R2sB/S2sB<1.4 \tag{11-2}$$

The first lens group G1 includes at least one negative lens and at least one positive lens. Assuming that an average value of Abbe numbers of all the negative lenses of the first lens group G1 based on the d line is v1n, and an average value of the Abbe numbers of all the positive lenses of the first lens group G1 based on the d line is v1p, it is preferable that the imaging lens satisfy Conditional Expression (12). By not allowing the corresponding value of Conditional Expression (12) to be equal to or less than the lower limit, there is an advantage in correcting lateral chromatic aberration. By not allowing the corresponding value of Conditional Expression (12) to be equal to or greater than the upper limit, there is an advantage in correcting longitudinal chromatic aberration. In order to obtain more favorable characteristics, it is more preferable that the imaging lens satisfies Conditional Expression (12-1), and it is yet more preferable that the imaging lens satisfies Conditional Expression (12-2).

$$-10<\nu 1n-\nu 1p<40 \quad (12)$$

$$-4<\nu 1n-\nu 1p<30 \quad (12\text{-}1)$$

$$0<\nu 1n-\nu 1p<19 \quad (12\text{-}2)$$

The first lens group G1 includes at least one negative lens and at least one positive lens. Assuming that an average value of the partial dispersion ratios of all negative lenses of the first lens group G1 between the g line and the F line is $\theta 1n$, and an average value of the partial dispersion ratios of all the positive lenses of the first lens group G1 between the g line and the F line is $\theta 1p$, it is preferable that the imaging lens satisfy Conditional Expression (13). By not allowing the corresponding value of Conditional Expression (13) within the range of Conditional Expression (13), it is possible to suppress occurrence of secondary chromatic aberration. It should be noted that a partial dispersion ratio $\theta$ of a lens between the g line and the F line is defined as $\theta=(Ng-NF)/(NF-NC)$, where the refractive indices of the lens at the g line, the F line, and the C line are Ng, NF, and NC, respectively. In order to obtain more favorable characteristics, it is more preferable that the imaging lens satisfies Conditional Expression (13-1), and it is yet more preferable that the imaging lens satisfies Conditional Expression (13-2).

$$-0.1<\theta 1n-\theta 1p<0.1 \quad (13)$$

$$-0.06<\theta 1n-\theta 1p<0.06 \quad (13\text{-}1)$$

$$-0.04<\theta 1n-\theta 1p<0.05 \quad (13\text{-}2)$$

Assuming that a refractive index of the positive lens of the third lens group G3 at the d line is N3p, it is preferable that the imaging lens satisfies Conditional Expression (14). In a case where the astigmatism and the distortion at the low angle of view are corrected, the astigmatism and the distortion at the high angle of view are likely to occur. However, by not allowing the corresponding value of Conditional Expression (14) to be equal to or less than the lower limit, it is possible to suppress occurrence of astigmatism and distortion at a high angle of view In such a case. By not allowing the corresponding value of Conditional Expression (14) to be equal to or greater than the upper limit, there is an advantage in correcting astigmatism and distortion at a low angle of view. In order to obtain more favorable characteristics, it is more preferable that the imaging lens satisfies Conditional Expression (14-1), and it is yet more preferable that the imaging lens satisfies Conditional Expression (14-2).

$$1.6<N3p<2.5 \quad (14)$$

$$1.8<N3p<2.2 \quad (14\text{-}1)$$

$$1.85<N3p<2.1 \quad (14\text{-}2)$$

Assuming that a refractive index of the negative lens of the third lens group G3 at the d line is N3n, it is preferable that the imaging lens satisfies Conditional Expression (15). By not allowing the corresponding value of Conditional Expression (15) to be equal to or less than the lower limit, it is possible to suppress occurrence of astigmatism and distortion, which are likely to occur in a case where astigmatism and distortion at low angles of view are corrected, at high angles of view. By not allowing the corresponding value of Conditional Expression (15) to be equal to or greater than the upper limit, there is an advantage in correcting astigmatism and distortion at a low angle of view. In order to obtain more favorable characteristics, it is more preferable that the imaging lens satisfies Conditional Expression (15-1), and it is yet more preferable that the imaging lens satisfies Conditional Expression (15-2).

$$1.55<N3n<2.5 \quad (15)$$

$$1.6<N3n<2.2 \quad (15\text{-}1)$$

$$1.65<N3n<1.95 \quad (15\text{-}2)$$

The first lens group G1 includes at least one positive lens. Assuming that an average value of the refractive indices of all the positive lenses of the first lens group G1 with respect to the d line is N1p, it is preferable that the imaging lens satisfies Conditional Expression (16). By not allowing the corresponding value of Conditional Expression (16) to be equal to or less than the lower limit, it is possible to suppress occurrence of astigmatism. By not allowing the corresponding value of Conditional Expression (16) to be equal to or greater than the upper limit, it is possible to suppress occurrence of distortion. In order to obtain more favorable characteristics, it is more preferable that the imaging lens satisfies Conditional Expression (16-1), and it is yet more preferable that the imaging lens satisfies Conditional Expression (16-2).

$$1.55<N1p<2.5 \quad (16)$$

$$1.65<N1p<2.2 \quad (16\text{-}1)$$

$$1.7<N1p<1.95 \quad (16\text{-}2)$$

The first lens group G1 includes at least one negative lens. Assuming that an average value of the refractive indices of all the negative lenses of the first lens group G1 with respect to the d line is N1n, it is preferable that the imaging lens satisfies Conditional Expression (17). By not allowing the corresponding value of Conditional Expression (17) to be equal to or less than the lower limit, it is possible to suppress occurrence of distortion. By not allowing the corresponding value of Conditional Expression (17) to be equal to or greater than the upper limit, it is possible to suppress occurrence of lateral chromatic aberration. In order to obtain more favorable characteristics, it is more preferable that the imaging lens satisfies Conditional Expression (17-1), and it is yet more preferable that the imaging lens satisfies Conditional Expression (17-2).

$$1.43<N1n<2.1 \quad (17)$$

$$1.48<N1n<1.8 \quad (17\text{-}1)$$

$$1.5<N1n<1.7 \quad (17\text{-}2)$$

Assuming that an average value of the Abbe numbers of all the positive lenses of the second lens group G2 based on the d line except the lens closest to the image side in the second lens group G2 is $\nu 2Fp$, it is preferable that the imaging lens satisfies Conditional Expression (18). By not allowing the corresponding value of Conditional Expression (18) to be equal to or less than the lower limit, it is possible to suppress occurrence of longitudinal chromatic aberration. By not allowing the corresponding value of Conditional Expression (18) to be equal to or greater than the upper limit, it is possible to prevent the refractive index of the positive lens of the second lens group G2 except the lens closest to the image side in the second lens group G2 from becoming excessively low. Thus, it is possible to suppress occurrence of spherical aberration. In order to obtain more favorable characteristics, it is more preferable that the imaging lens satisfies Conditional Expression (18-1), and it is yet more preferable that the imaging lens satisfies Conditional Expression (18-2).

$$35 < v2Fp < 85 \tag{18}$$

$$37 < v2Fp < 75 \tag{18-1}$$

$$40 < v2Fp < 61 \tag{18-2}$$

Assuming that an average value of Abbe numbers of all negative lenses of the second lens group G2 except the lens closest to the image side in the second lens group G2 based on the d line is v2Fn, it is preferable that the imaging lens satisfies Conditional Expression (19). By not allowing the corresponding value of Conditional Expression (19) to be equal to or less than the lower limit, it is possible to suppress occurrence of secondary longitudinal chromatic aberration. By not allowing the corresponding value of Conditional Expression (19) to be equal to or greater than the upper limit, there is an advantage in correcting longitudinal chromatic aberration. In order to obtain more favorable characteristics, it is more preferable that the imaging lens satisfies Conditional Expression (19-1), and it is yet more preferable that the imaging lens satisfies Conditional Expression (19-2).

$$28 < v2Fn < 55 \tag{19}$$

$$35 < v2Fn < 50 \tag{19-1}$$

$$37 < v2Fn < 45 \tag{19-2}$$

The lens closest to the object side in the first lens group G1 and the lens which is second from the object side in the first lens group G1 are negative lenses. Assuming that a focal length of the lens closest to the object side in the first lens group G1 is fL1 and a focal length of the lens which is second from the object side in the first lens group G1 is fL2, it is preferable that the imaging lens satisfies Conditional Expression (20). By not allowing the corresponding value of Conditional Expression (20) to be equal to or less than the lower limit, there is an advantage in achieving a wide angle. By not allowing the corresponding value of Conditional Expression (20) to be equal to or greater than the upper limit, there is an advantage in correcting distortion and lateral chromatic aberration. In order to obtain more favorable characteristics, it is more preferable that the imaging lens satisfies Conditional Expression (20-1), and it is yet more preferable that the imaging lens satisfies Conditional Expression (20-2).

$$0 < fL2/fL1 < 1 \tag{20}$$

$$0.05 < fL2/fL1 < 0.8 \tag{20-1}$$

$$0.1 < fL2/fL1 < 0.7 \tag{20-2}$$

Assuming that a focal length of the negative lens of the third lens group G3 is f3n, a focal length of the positive lens of the third lens group G3 is f3p, and a focal length of the imaging lens in the state of focusing on an object at infinity is f, it is preferable that the imaging lens satisfies Conditional Expression (21). In a case where both the negative lens and the positive lens of the third lens group G3 have strong refractive powers, the absolute value of $(1/f3n-1/f3p) \times f$ is large. By not allowing the corresponding value of Conditional Expression (21) to be equal to or less than the lower limit, it is possible to suppress an increase in lateral chromatic aberration at a high angle of view. By not allowing the corresponding value of Conditional Expression (21) to be equal to or greater than the upper limit, there is an advantage in correcting lateral chromatic aberration and distortion. In order to obtain more favorable characteristics, it is more preferable that the imaging lens satisfies Conditional Expression (21-1), and it is yet more preferable that the imaging lens satisfies Conditional Expression (21-2).

$$-4 < (1/f3n - 1/f3p) \times f < -1 \tag{21}$$

$$-3.5 < (1/f3n - 1/f3p) \times f < -1.2 \tag{21-1}$$

$$-3 < (1/f3n - 1/f3p) \times f < -1.3 \tag{21-2}$$

Assuming that a lateral magnification of the second lens group G2 in a state where the object at infinity is in focus is β2 and a lateral magnification of the third lens group G3 in the state where the object at infinity is in focus is β3, it is preferable that the imaging lens satisfies Conditional Expression (22). By not allowing the corresponding value of Conditional Expression (22) to be equal to or less than the lower limit, it is possible to reduce the amount of movement of the second lens group G2 during focusing. By not allowing the corresponding value of Conditional Expression (22) to be equal to or greater than the upper limit, it is possible to suppress fluctuation in spherical aberration and fluctuation in field curvature during focusing. In order to obtain more favorable characteristics, it is more preferable that the imaging lens satisfies Conditional Expression (22-1), and it is yet more preferable that the imaging lens satisfies Conditional Expression (22-2).

$$0.8 < (1-\beta2^2) \times \beta3^2 < 2.6 \tag{22}$$

$$1 < (1-\beta2^2) \times \beta3^2 < 2.4 \tag{22-1}$$

$$1.2 < (1-\beta2^2) \times \beta3^2 < 2.2 \tag{22-2}$$

Assuming that a lateral magnification of the third lens group G3 in the state where an object at infinity is in focus is β3, it is preferable that the imaging lens satisfies Conditional Expression (23). By not allowing the corresponding value of Conditional Expression (23) to be equal to or less than the lower limit, it is possible to reduce the amount of movement of the focus group during focusing. By not allowing the corresponding value of Conditional Expression (23) to be equal to or greater than the upper limit, it is possible to suppress fluctuation in spherical aberration and fluctuation in field curvature during focusing. In order to obtain more favorable characteristics, it is more preferable that the imaging lens satisfies Conditional Expression (23-1), and it is yet more preferable that the imaging lens satisfies Conditional Expression (23-2).

$$1.4 < \beta3^2 < 3 \tag{23}$$

$$1.55 < \beta3^2 < 2.3 \tag{23-1}$$

$$1.7 < \beta3^2 < 2.1 \tag{23-2}$$

It should be noted that FIG. 1 shows an example in which the focus group consists of only the second lens group G2, but the focus group can take various forms. For example, the first lens group G1 and the second lens group G2 may integrally move along the optical axis Z during focusing. By moving the first lens group G1 and the second lens group G2 integrally during focusing, it is possible to suppress fluctuations in spherical aberration and field curvature during focusing. Here, the phrase "moving integrally" means moving by the same amount in the same direction at the same time.

Another mode of the focus group may be a mode in which the first lens group G1 and the second lens group G2 moves along the optical axis Z by changing the mutual distance therebetween during focusing. By moving the first lens group G1 and the second lens group G2 along different loci during focusing, it is possible to better suppress fluctuation in field curvature during focusing. In a case where both the first lens group G1 and the second lens group G2 move along the optical axis Z by changing the mutual distance therebetween during focusing, it is preferable that the amount of movement of the first lens group G1 is smaller than the amount of movement of the second lens group G2 during focusing. In such a case, there is an advantage in reducing the effective diameter of the lenses of the first lens group G1.

Various modes can be adopted for the aperture stop St during focusing. For example, the aperture stop St may move integrally with the second lens group G2 during focusing. In such a case, fluctuation of the principal ray during focusing can be reduced. Thus, fluctuation in astigmatism during focusing can be suppressed. Alternatively, the aperture stop St may move integrally with the first lens group G1 or remain stationary integrally with the first lens group G1 during focusing. In such a case, there is an advantage in reducing the effective diameter of the lenses of the first lens group G1. Alternatively, the aperture stop St may move along the optical axis Z by changing the mutual distance between both the first lens group G1 and the second lens group G2 during focusing. In such a case, it is easy to suppress fluctuations in aberrations during focusing with favorable balance. Alternatively, the aperture stop St may remain stationary with respect to the image plane Sim during focusing, as in the example shown in FIG. 1. In such a case, the configuration can be simplified.

Next, a possible configuration example of the imaging lens of the present disclosure will be described. In each of the first to sixth configuration examples described below, the imaging lens consists of, in order from the object side, a first lens group G1, an aperture stop St, a second lens group G2, and a third lens group G3.

The first configuration example corresponds to the configuration of Example 1 described later. The first lens group G1 of the first configuration example consists of, in order from the object side to the image side, a negative meniscus lens having a surface convex toward the object side, and a cemented lens in which a biconcave lens and a biconvex lens are cemented in order from the object side. The second lens group G2 of the first configuration example consists of, in order from the object side to the image side, a cemented lens in which a biconvex lens and a biconcave lens are cemented in order from the object side, a cemented lens in which a biconcave lens and a biconvex lens are cemented in order from the object side, and a negative meniscus lens having a surface concave toward the object side. The third lens group G3 of the first configuration example consists of a biconcave lens and a biconvex lens in order from the object side to the image side.

The second configuration example corresponds to the configuration of Example 2 described later. The first lens group G1 of the second configuration example has the same configuration as the first lens group G1 of the first configuration example. The second lens group G2 of the second configuration example consists of a cemented lens in which a biconcave lens and a biconvex lens are cemented in order from the object side, a cemented lens in which a biconcave lens and a biconvex lens are cemented in order from the object side, and a negative meniscus lens having a surface concave toward the object side. The third lens group G3 of the second configuration example has the same configuration as the third lens group G3 of the first configuration example.

The third configuration example corresponds to the configuration of Example 3 described later. The first lens group G1 of the third configuration example consists of, in order from the object side to the image side, a negative meniscus lens having a surface convex toward the object side, and a cemented lens in which a negative meniscus lens having a surface convex toward the object side and a biconvex lens are cemented in order from the object side. The second lens group G2 of the third configuration example consists of a cemented lens in which a biconcave lens and a biconvex lens are cemented in order from the object side, a cemented lens in which a biconcave lens and a biconvex lens are cemented in order from the object side, and a positive meniscus lens having a surface concave toward the object side. The third lens group G3 of the third configuration example consists of, in order from the object side to the image side, a negative meniscus lens having a surface concave toward the object side, and a biconvex lens.

The fourth configuration example corresponds to the configurations of Example 4 and Example 5 described later. The first lens group G1 of the fourth configuration example has the same configuration as the first lens group G1 of the first configuration example. The second lens group G2 and the third lens group G3 of the fourth configuration example have the same configurations as the second lens group G2 and the third lens group G3 of the third configuration example, respectively.

The fifth configuration example corresponds to the configuration of Example 6 described later. The first lens group G1 and the second lens group G2 of the fifth configuration example have the same configurations as the first lens group G1 and the second lens group G2 of the third configuration example, respectively. The third lens group G3 of the fifth configuration example consists of, in order from the object side to the image side, a negative meniscus lens having a surface concave toward the object side and a positive meniscus lens having a surface concave toward the object side.

The sixth configuration example corresponds to the configuration of Example 7 described later. The first lens group G1 of the sixth configuration example consists of, in order from the object side to the image side, a positive meniscus lens having a surface convex toward the object side, and a cemented lens in which a biconcave lens and a biconvex lens are cemented in order from the object side. The second lens group G2 of the sixth configuration example consists of a cemented lens in which a biconcave lens and a biconvex lens are cemented in order from the object side to the image side, a negative meniscus lens having a surface concave toward the object side, a cemented lens in which a positive meniscus lens having a surface concave toward the object side is cemented in order from the object side, and a positive meniscus lens having a surface concave toward the object side. The third lens group G3 of the sixth configuration example consists of, in order from the object side to the image side, a positive meniscus lens having a surface concave toward the object side, and a biconcave lens.

The above-mentioned preferred configurations and available configurations including the configurations relating to the conditional expressions may be any combination, and it is preferable to optionally adopt the configurations in accordance with required specification.

Next, examples of the imaging lens of the present disclosure will be described.

Example 1

FIG. 1 is a cross-sectional view showing a configuration and rays of the imaging lens of Example 1, and the illustration method thereof is as described above. Therefore, repeated description is partially omitted. The imaging lens of Example 1 consists of, in order from the object side to the image side, a first lens group G1 having a negative refractive power, an aperture stop St, a second lens group G2 having a positive refractive power, and a third lens group G3 having a negative refractive power. The first lens group G1 consists of three lenses L11 to L13 in order from the object side to the image side. The second lens group G2 consists of five lenses L21 to L25 in order from the object side to the image side. The third lens group G3 consists of two lenses L31 and L32, in order from the object side to the image side.

As an example, FIG. 1 shows an example in which the focus group consists of only the second lens group G2. However, as described above, it is also possible to adopt a configuration in which the first lens group G1 and the second lens group G2 move integrally during focusing, and a configuration in which the first lens group G1 and the second lens group G2 move by changing the mutual distance therebetween during focusing. In such configurations, during focusing from the object at infinity to the closest object, both focus groups move to the object side. This point regarding the focus group is the same in the following embodiments.

Regarding the imaging lens of Example 1, Table 1 shows basic lens data, Table 2 shows specification and variable surface distance, and Table 3 shows aspheric surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. The column of Nd shows refractive indices of the respective components at the d line. The column of νd shows Abbe numbers of the respective components based on the d line. The column of θgF shows partial dispersion ratios of the respective components between the g line and the F line. For lenses, the column of materials shows material names of the respective lenses and names of manufacturers thereof with periods interposed therebetween. The names of the manufacturers are shown schematically. "OHARA" is Ohara Co., Ltd., "HOYA" is HOYA CORPORATION, "NHG" is Hubei New HuaGuang Information Materials Co., Ltd, "CDGM" is Chengdu Guangming Photoelectric, and "SUMITA" is SUMITA OPTICAL GLASS, Inc..

In Table 1, the sign of the radius of curvature of the surface convex toward the object side is positive and the sign of the radius of curvature of the surface convex toward the image side is negative. Table 1 also shows the aperture stop St and the optical member PP. In a place of a surface number of a surface corresponding to the aperture stop St, the surface number and a term of (St) are noted. A value at the bottom place of D in Table 1 indicates a distance between the image plane Sim and the surface closest to the image side in the table. In Table 1, the symbol DD[ ] is used for each variable surface distance that varies during focusing, and the object side surface number of the distance is given in [ ] and is noted in the column D.

Table 2 shows values of the focal length f, the back focal length Bf at the air conversion distance, the F number FNo., the maximum total angle of view 2ωmax, and the variable surface distance.(°) in the place of 2ωmax indicates that the unit thereof is a degree. The values shown in Table 2 are based on the d line. In Table 2, the values in a case where the object distance is the object at infinity and 400 mm (millimeter) are shown in columns labeled "infinity" and "400 mm", respectively. The object distance is a distance from the object to the lens surface closest to the object side on the optical axis.

In Table 1, the reference sign * is attached to surface numbers of aspheric surfaces, and numerical values of the paraxial radius of curvature are written into the column of the radius of curvature of the aspheric surface. In Table 3, the row of Sn shows surface numbers of the aspheric surfaces, and the rows of KA and Am (m=3, 4, 5, . . . , 20) shows numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of the paraxial radius of curvature, KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

| | | | Example 1 | | | |
|---|---|---|---|---|---|---|
| Sn | R | D | Nd | νd | θgF | Material |
| *1 | 75.68710 | 1.854 | 1.51633 | 64.06 | 0.53345 | L-BSL7.OHARA |
| *2 | 19.28374 | 5.511 | | | | |
| 3 | −38.47773 | 1.110 | 1.51742 | 52.43 | 0.55649 | S-NSL36.OHARA |
| 4 | 16.16828 | 5.385 | 1.87070 | 40.73 | 0.56825 | TAFD32.HOYA |
| 5 | −202.09283 | 5.000 | | | | |
| 6(St) | ∞ | DD[6] | | | | |
| 7 | 22.64638 | 4.411 | 1.49700 | 81.54 | 0.53748 | S-FPL51.OHARA |
| 8 | −11.76112 | 1.000 | 1.62588 | 35.71 | 0.58964 | H-F13.NHG |

TABLE 1-continued

Example 1

| Sn | R | D | Nd | vd | θgF | Material |
|---|---|---|---|---|---|---|
| 9 | 83.51630 | 0.700 | | | | |
| 10 | −183.75799 | 1.010 | 1.58144 | 40.75 | 0.57757 | S-TIL25.OHARA |
| 11 | 29.46568 | 5.132 | 1.88300 | 39.22 | 0.57295 | H-ZLAF68N.CDGM |
| 12 | −21.06025 | 3.156 | | | | |
| *13 | −10.93318 | 2.008 | 1.80998 | 40.95 | 0.56644 | K-VC89.SUMITA |
| *14 | −12.72668 | DD[14] | | | | |
| 15 | −25.00000 | 2.000 | 1.78472 | 25.68 | 0.61621 | S-TIH11.OHARA |
| 16 | 250.76231 | 3.000 | | | | |
| 17 | 88.23734 | 6.373 | 2.00100 | 29.13 | 0.59952 | TAFD55.HOYA |
| 18 | −103.84217 | 13.696 | | | | |
| 19 | ∞ | 0.900 | 1.54763 | 54.98 | 0.55247 | |
| 20 | ∞ | 1.200 | | | | |
| 21 | ∞ | 0.700 | 1.54763 | 54.98 | 0.55247 | |
| 22 | ∞ | 0.600 | 1.54763 | 54.98 | 0.55247 | |
| 23 | ∞ | 3.800 | | | | |
| 24 | ∞ | 1.000 | 1.49784 | 54.98 | 0.55000 | |
| 25 | ∞ | 1.060 | | | | |

TABLE 2

Example 1

| Object Distance | Infinity | 400 mm |
|---|---|---|
| f | 30.919 | 30.566 |
| Bf | 21.845 | 19.482 |
| FNo. | 4.62 | 4.76 |
| 2ωmax(°) | 90.6 | 88.2 |
| DD[6] | 3.956 | 2.763 |
| DD[14] | 2.000 | 3.193 |

TABLE 3

Example 1

| Sn | 1 | 2 | 13 | 14 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 3.1098861E−04 | 3.7296493E−04 | 3.2495662E−04 | 2.9236238E−04 |
| A5 | 0.0000000E+00 | 0.0000000E+00 | −1.5636182E−05 | −1.5516557E−05 |
| A6 | −3.0872307E−06 | −1.9055929E−06 | 4.3641307E−06 | 3.6624541E−06 |
| A7 | 0.0000000E+00 | 0.0000000E+00 | −1.7115477E−08 | 8.7555789E−09 |
| A8 | 2.3437272E−08 | −3.2610975E−09 | −2.4945541E−08 | −1.5897468E−08 |
| A9 | 0.0000000E+00 | 0.0000000E+00 | −1.7751671E−09 | −1.1569703E−09 |
| A10 | −6.1436321E−11 | 2.7348696E−10 | −6.7738174E−12 | −2.5650006E−11 |
| A11 | 0.0000000E+00 | 0.0000000E+00 | 1.1487420E−11 | 3.7963003E−12 |
| A12 | −4.6510997E−13 | 1.8726414E−12 | 1.2409708E−12 | 6.0817614E−13 |
| A13 | 0.0000000E+00 | 0.0000000E+00 | 8.0757576E−14 | 4.2272228E−14 |
| A14 | 3.0960624E−15 | −6.1675238E−14 | −1.3812329E−16 | 1.3131510E−15 |
| A15 | 0.0000000E+00 | 0.0000000E+00 | −3.6933243E−16 | −1.7015354E−16 |
| A16 | 9.4249837E−18 | 1.1801651E−16 | −5.2820560E−17 | −2.8776897E−17 |
| A17 | 0.0000000E+00 | 0.0000000E+00 | −4.8233626E−18 | −1.9776109E−18 |
| A18 | −1.2161288E−19 | 4.4461493E−18 | −1.3493871E−19 | 4.9115316E−20 |
| A19 | 0.0000000E+00 | 0.0000000E+00 | −1.7661879E−21 | 2.3166274E−20 |
| A20 | 2.7547312E−22 | −2.2186314E−20 | 6.1362281E−21 | −7.6602814E−22 |

Figure 2:
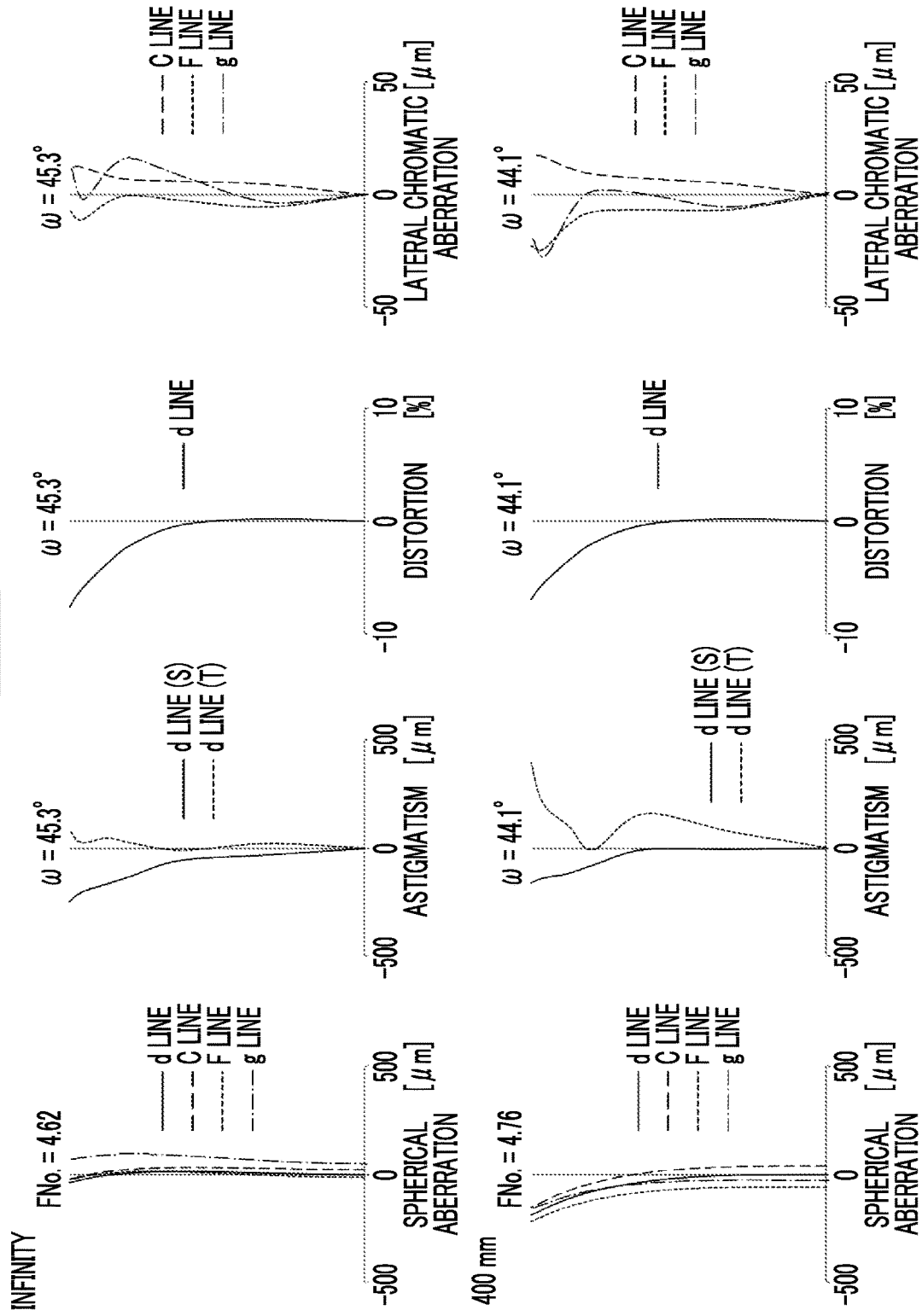
FIG. 2 is a diagram showing aberrations of the imaging lens of Example 1.

FIG. 2 shows a diagram of aberrations of the imaging lens of Example 1. In FIG. 2, in order from the left side, spherical aberration, astigmatism, distortion, and lateral chromatic aberration are shown. FIG. 2 shows aberration diagrams in a state where the object at infinity is in focus in the upper part labeled "infinity", and shows aberration diagrams in a state where the object at the object distance of 400 mm (millimeter) is in focus in the lower part labeled "400 mm". In spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In lateral chromatic aberration, aberrations at the C line, the F line, and the g line are respectively indicated by the long dashed line, the short dashed line, and the chain line. In spherical aberration diagram, FNo. indicates an F number. In the other aberration diagrams, ω indicates a half angle of view. FIG. 2 also shows values of the FNo. and ω corresponding to the vertically upper part of each diagram.

Symbols, meanings, description methods, and illustration methods of the respective data pieces according to Example 1 are the same as those in the following examples unless otherwise specified. Therefore, in the following description, repeated description will be omitted.

Example 2

Figure 3:
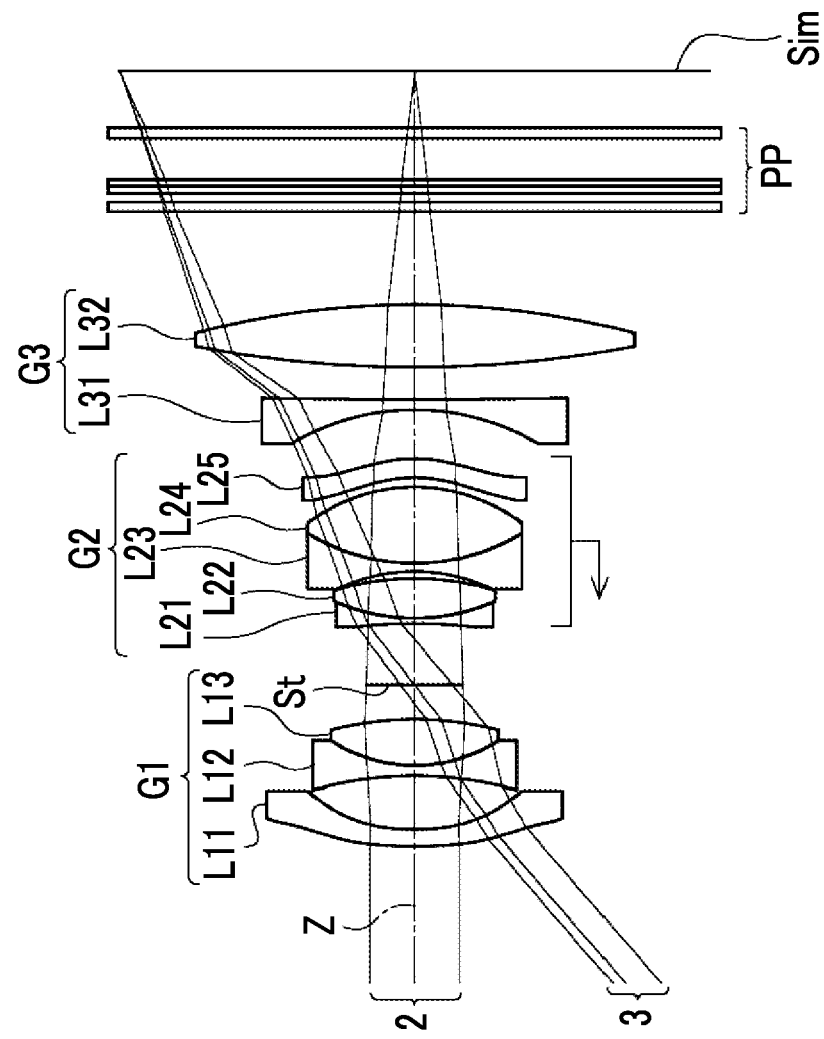
FIG. 3 is a cross-sectional view showing a configuration and rays of an imaging lens of Example 2.

FIG. 3 is a cross-sectional view showing a configuration and rays of the imaging lens of Example 2. The imaging lens of Example 2 consists of, in order from the object side to the image side, a first lens group G1 having a positive refractive power, an aperture stop St, a second lens group G2 having a positive refractive power, and a third lens group G3 having a negative refractive power. The first lens group G1 consists of three lenses L11 to L13 in order from the object side to the image side. The second lens group G2 consists of five lenses L21 to L25 in order from the object side to the image side. The third lens group G3 consists of two lenses L31 and L32, in order from the object side to the image side.

Figure 4:
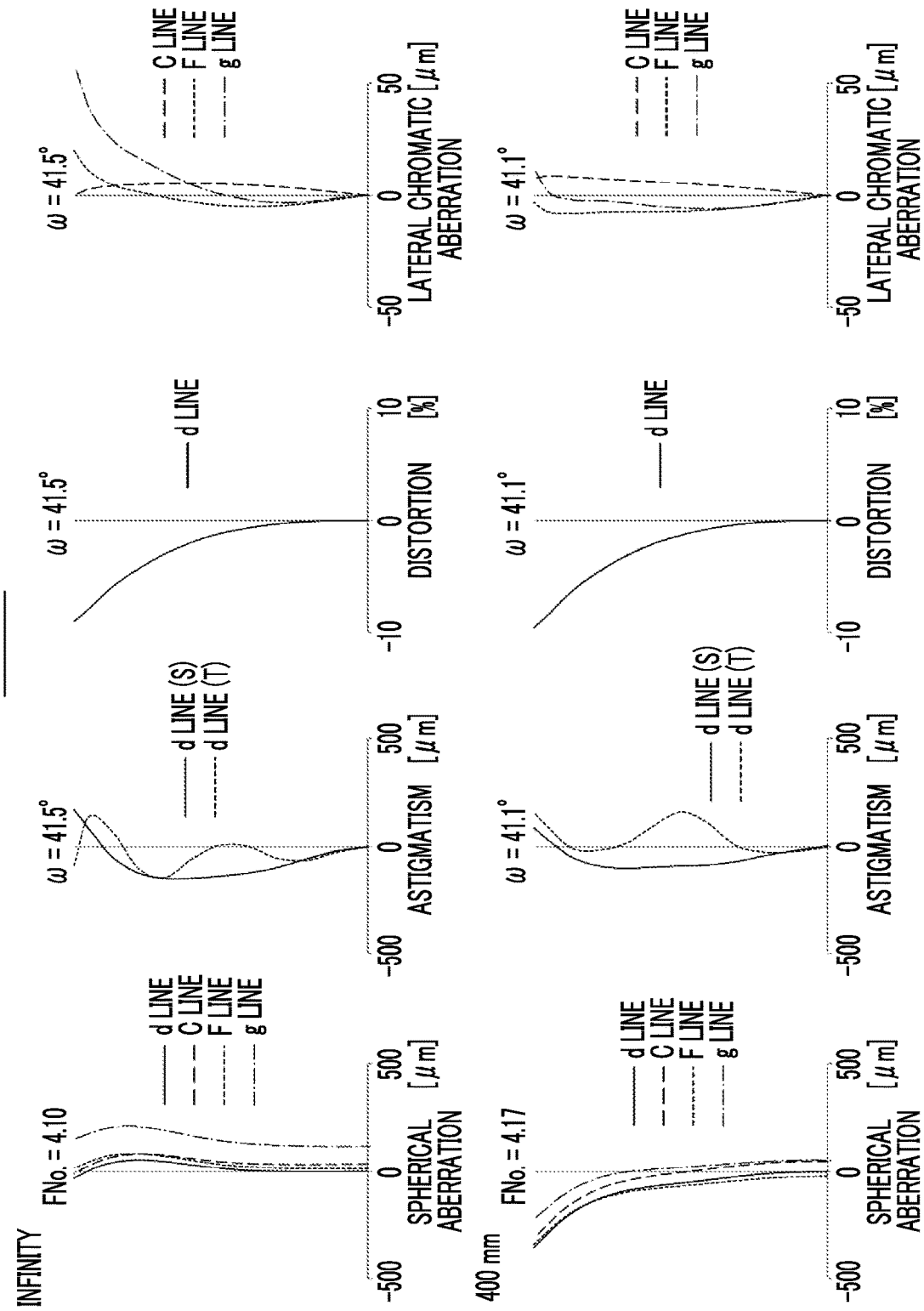
FIG. 4 is a diagram showing aberrations of the imaging lens of Example 2.

Regarding the imaging lens of Example 2, Table 4 shows basic lens data, Table 5 shows specification and variable surface distances, and Table 6 shows aspheric surface coefficients thereof, and FIG. 4 shows aberration diagrams. FIG. 4 shows aberration diagrams in a state where the object at infinity is in focus in the upper part, and shows aberration diagrams in a state where the object at the object distance of 400 mm (millimeter) is in focus in the lower part.

TABLE 4

Example 2

| Sn | R | D | Nd | νd | θgF | Material |
|---|---|---|---|---|---|---|
| *1 | 68.18783 | 1.600 | 1.50670 | 70.54 | 0.53890 | K-PG325.SUMITA |
| *2 | 26.10177 | 5.044 | | | | |
| 3 | −37.92101 | 1.008 | 1.57099 | 50.80 | 0.55887 | S-BAL2.OHARA |
| 4 | 15.40862 | 4.400 | 1.74100 | 52.64 | 0.54676 | S-LAL61.OHARA |
| 5 | −33.34498 | 3.267 | | | | |
| 6(St) | ∞ | DD[6] | | | | |
| 7 | −51.97967 | 0.510 | 1.54814 | 45.78 | 0.56859 | S-TIL1.OHARA |
| 8 | 19.96008 | 3.783 | 1.88300 | 39.22 | 0.57295 | H-ZLAF68N.CDGM |
| 9 | −28.29840 | 0.674 | | | | |
| 10 | −17.78837 | 0.810 | 1.64769 | 33.87 | 0.59124 | K-SFLD2.SUMITA |
| 11 | 20.78401 | 7.273 | 1.62041 | 60.29 | 0.54266 | S-BSM16.OHARA |
| 12 | −17.85754 | 0.912 | | | | |
| *13 | −13.45927 | 1.800 | 1.80139 | 45.45 | 0.55814 | M-TAF31.HOYA |
| *14 | −14.39669 | DD[14] | | | | |
| 15 | −24.42897 | 1.000 | 1.78880 | 28.43 | 0.60092 | S-NBH58.OHARA |
| 16 | 886.37116 | 3.076 | | | | |
| 17 | 116.51731 | 6.000 | 2.00100 | 29.13 | 0.59952 | TAFD55.HOYA |
| 18 | −86.93889 | 8.800 | | | | |
| 19 | ∞ | 0.900 | 1.51680 | 64.20 | 0.53430 | |
| 20 | ∞ | 0.820 | | | | |
| 21 | ∞ | 0.700 | 1.51680 | 64.20 | 0.53430 | |
| 22 | ∞ | 0.600 | 1.51350 | 77.00 | 0.52020 | |
| 23 | ∞ | 4.000 | | | | |
| 24 | ∞ | 1.000 | 1.51000 | 55.00 | 0.55105 | |
| 25 | ∞ | 5.429 | | | | |

TABLE 5

Example 2

| Object Distance | Infinity | 400 mm |
|---|---|---|
| f | 35.913 | 34.706 |
| Bf | 21.162 | 18.066 |
| FNo. | 4.10 | 4.17 |
| 2ωmax(°) | 83.0 | 82.2 |
| DD[6] | 5.868 | 4.166 |
| DD[14] | 4.665 | 6.367 |

TABLE 6

Example 2

| Sn | 1 | 2 | 13 | 14 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.1230134E−04 | 2.3451300E−04 | 1.0207953E−04 | 1.1195837E−04 |
| A5 | −1.5711054E−05 | 4.9641260E−06 | 6.5367997E−05 | 4.6399935E−05 |
| A6 | 5.6624754E−07 | −7.8084655E−06 | −1.5360901E−05 | −1.0333753E−05 |
| A7 | 2.3188763E−07 | 1.8540643E−06 | −7.4820417E−07 | −2.7077306E−07 |
| A8 | −8.7784656E−08 | 2.0838939E−08 | 9.4656756E−07 | 5.0610206E−07 |
| A9 | 2.3845006E−09 | −8.6573901E−08 | −7.4419021E−08 | −3.8266950E−08 |
| A10 | 1.5876579E−09 | 6.7127573E−09 | −2.2527813E−08 | −1.0508806E−08 |
| A11 | −9.6944842E−11 | 1.8350339E−09 | 3.2642523E−09 | 1.4270063E−09 |
| A12 | −1.4462554E−11 | −2.0919183E−10 | 2.4343580E−10 | 1.0173411E−10 |
| A13 | 1.0875520E−12 | −2.1446300E−11 | −6.0302429E−11 | −2.3589635E−11 |
| A14 | 7.5832079E−14 | 2.9889778E−12 | −5.0783413E−13 | −1.9564324E−13 |
| A15 | −6.0075259E−15 | 1.4182869E−13 | 5.8816504E−13 | 2.0889575E−13 |
| A16 | −2.3508505E−16 | −2.3089902E−14 | −1.3842503E−14 | −4.7319709E−15 |

TABLE 6-continued

| | Example 2 | | | |
|---|---|---|---|---|
| Sn | 1 | 2 | 13 | 14 |
| A17 | 1.6726501E−17 | −4.9644097E−16 | −2.9620717E−15 | −9.6409012E−16 |
| A18 | 4.1585325E−19 | 9.3408529E−17 | 1.2577862E−16 | 3.9569910E−17 |
| A19 | −1.8753117E−20 | 7.1354964E−19 | 6.0511396E−18 | 1.8467718E−18 |
| A20 | −3.4119061E−22 | −1.5542213E−19 | −3.3279376E−19 | −9.8835214E−20 |

Example 3

Figure 5:
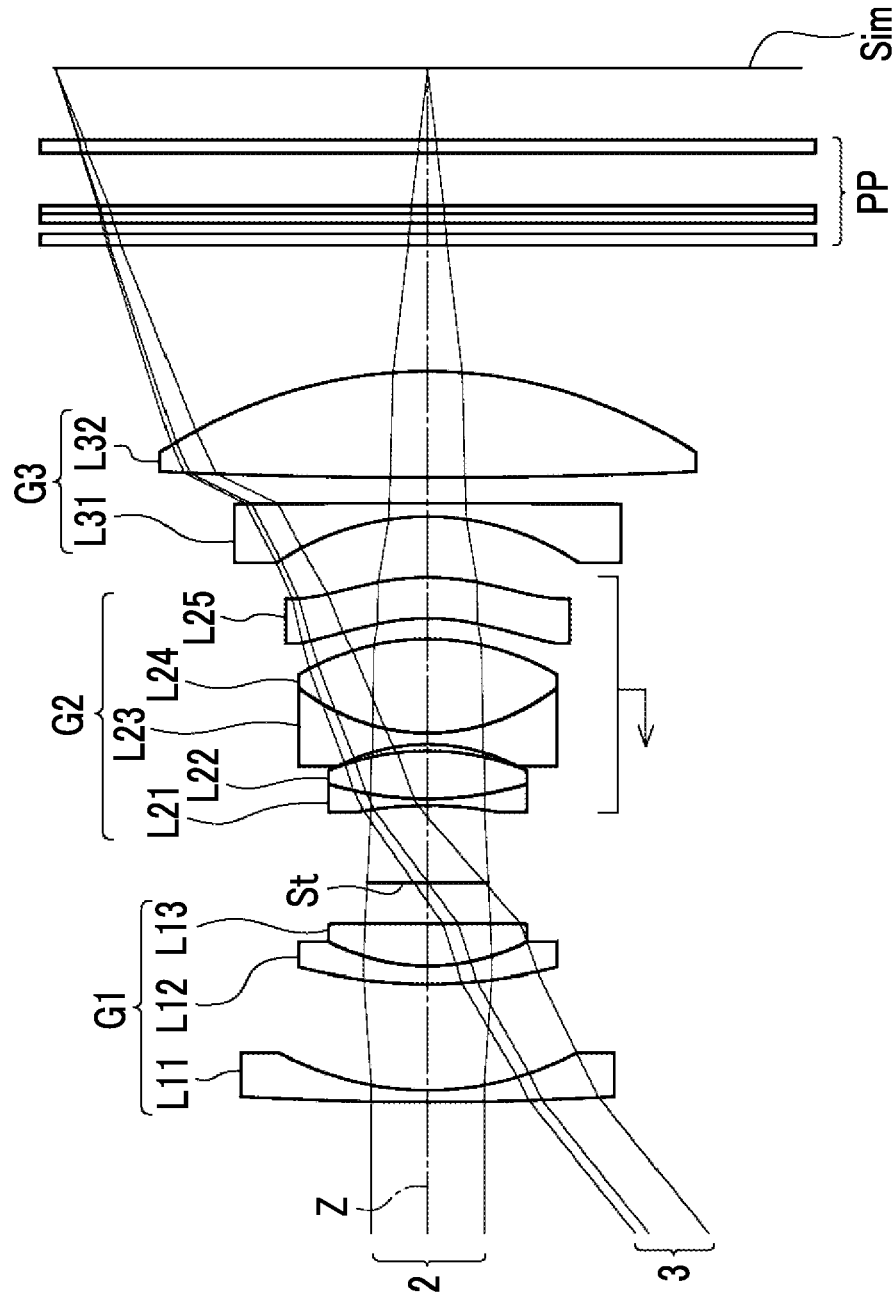
FIG. 5 is a cross-sectional view showing a configuration and rays of an imaging lens of Example 3.

FIG. 5 is a cross-sectional view showing a configuration and rays of the imaging lens of Example 3. The imaging lens of Example 3 consists of, in order from the object side to the image side, a first lens group G1 having a positive refractive power, an aperture stop St, a second lens group G2 having a positive refractive power, and a third lens group G3 having a negative refractive power. The first lens group G1 consists of three lenses L11 to L13 in order from the object side to the image side. The second lens group G2 consists of five lenses L21 to L25 in order from the object side to the image side. The third lens group G3 consists of two lenses L31 and L32, in order from the object side to the image side.

Figure 6:
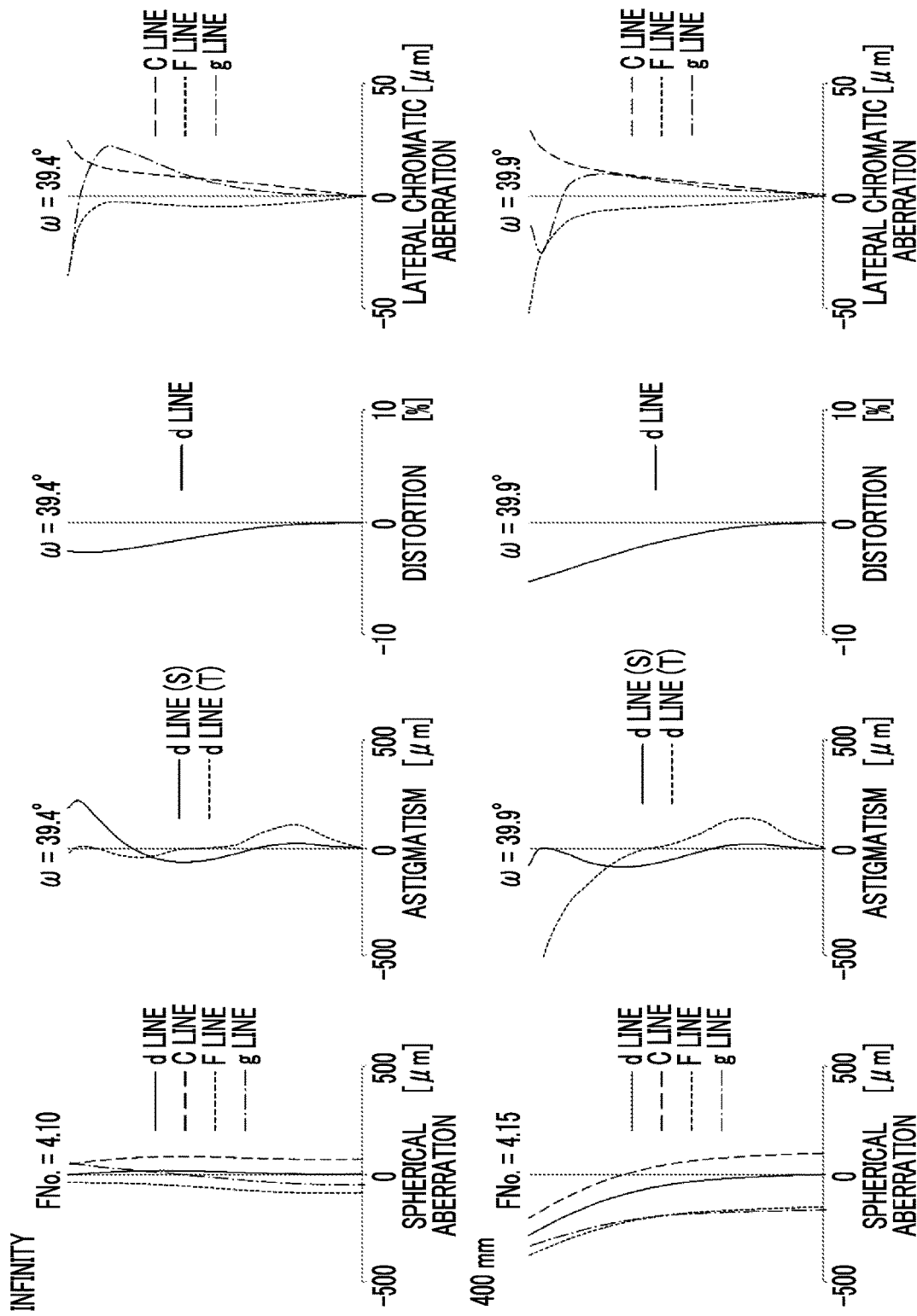
FIG. 6 is a diagram showing aberrations of the imaging lens of Example 3.

Regarding the imaging lens of Example 3, Table 7 shows basic lens data, Table 8 shows specification and variable surface distances, and Table 9 shows aspheric surface coefficients thereof, and FIG. 6 shows aberration diagrams. FIG. 6 shows aberration diagrams in a state where the object at infinity is in focus in the upper part, and shows aberration diagrams in a state where the object at the object distance of 400 mm (millimeter) is in focus in the lower part.

TABLE 7

| | Example 3 | | | | | |
|---|---|---|---|---|---|---|
| Sn | R | D | Nd | vd | θgF | Material |
| 1 | 250.30127 | 0.900 | 1.47047 | 66.88 | 0.53218 | H-QK1.CDGM |
| 2 | 25.14676 | 8.000 | | | | |
| 3 | 41.22340 | 1.310 | 1.77047 | 29.74 | 0.59514 | NBFD29.HOYA |
| 4 | 16.95976 | 3.208 | 1.88300 | 40.76 | 0.56679 | S-LAH58.OHARA |
| 5 | −1504.42231 | 3.106 | | | | |
| 6(St) | ∞ | DD[6] | | | | |
| 7 | −30.64661 | 0.510 | 1.51742 | 52.43 | 0.55649 | S-NSL36.OHARA |
| 8 | 27.10340 | 3.615 | 1.85883 | 30.00 | 0.59793 | NBFD30.HOYA |
| 9 | −20.97398 | 0.500 | | | | |
| 10 | −15.58132 | 0.860 | 1.68893 | 31.07 | 0.60041 | S-TIM28.OHARA |
| 11 | 16.39102 | 7.111 | 1.71300 | 53.87 | 0.54587 | S-LAL8.OHARA |
| 12 | −20.00041 | 1.554 | | | | |
| *13 | −18.19793 | 3.105 | 1.77250 | 49.50 | 0.55193 | M-TAF105.HOYA |
| *14 | −19.11171 | DD[14] | | | | |
| 15 | −21.52053 | 1.000 | 1.89286 | 20.36 | 0.63944 | S-NPH4.OHARA |
| 16 | −2587.45558 | 1.954 | | | | |
| 17 | 485.01350 | 8.039 | 2.00069 | 25.46 | 0.61364 | TAFD40.HOYA |
| 18 | −38.07825 | 9.410 | | | | |
| 19 | ∞ | 0.900 | 1.51680 | 64.20 | 0.53430 | |
| 20 | ∞ | 0.820 | | | | |
| 21 | ∞ | 0.700 | 1.51680 | 64.20 | 0.53430 | |
| 22 | ∞ | 0.600 | 1.51350 | 77.00 | 0.52020 | |
| 23 | ∞ | 4.000 | | | | |
| 24 | ∞ | 1.000 | 1.51000 | 55.00 | 0.55105 | |
| 25 | ∞ | 5.421 | | | | |

TABLE 8

| Example 3 | | |
|---|---|---|
| Object Distance | Infinity | 400 mm |
| f | 35.983 | 34.897 |
| Bf | 21.765 | 18.669 |
| FNo. | 4.10 | 4.15 |
| 2ωmax(°) | 78.8 | 79.8 |
| DD[6] | 5.804 | 3.978 |
| DD[14] | 4.588 | 6.414 |

TABLE 9

| Example 3 | | |
|---|---|---|
| Sn | 13 | 14 |
| KA | 1.0000000E+00 | 1.0000000E+00 |
| A3 | 0.0000000E+00 | 0.0000000E+00 |
| A4 | 9.0363217E−05 | 9.3545039E−05 |
| A5 | −7.0384815E−06 | −2.9726223E−06 |
| A6 | 1.7524377E−06 | 3.1360222E−07 |
| A7 | −4.5819132E−08 | 6.6339273E−08 |
| A8 | −9.1117551E−09 | 5.1917233E−10 |
| A9 | 3.8980160E−10 | −4.5372050E−10 |
| A10 | 7.1063115E−11 | −3.5781489E−11 |
| A11 | 2.1201288E−12 | 2.0152910E−12 |
| A12 | −1.8380372E−12 | 2.1927496E−13 |
| A13 | 5.5635889E−15 | 5.7705323E−15 |

TABLE 9-continued

| | Example 3 | |
|---|---|---|
| Sn | 13 | 14 |
| A14 | 1.8104507E−14 | 9.1795658E−16 |
| A15 | 1.0517148E−16 | −1.6308789E−16 |
| A16 | −1.2383231E−16 | −1.2699045E−17 |
| A17 | −3.1640418E−18 | −2.6267555E−20 |
| A18 | 8.1013368E−19 | −4.8482345E−20 |
| A19 | −8.3410298E−21 | 2.6088371E−20 |
| A20 | −9.1911895E−22 | −1.2550831E−21 |

Example 4

Figure 7:
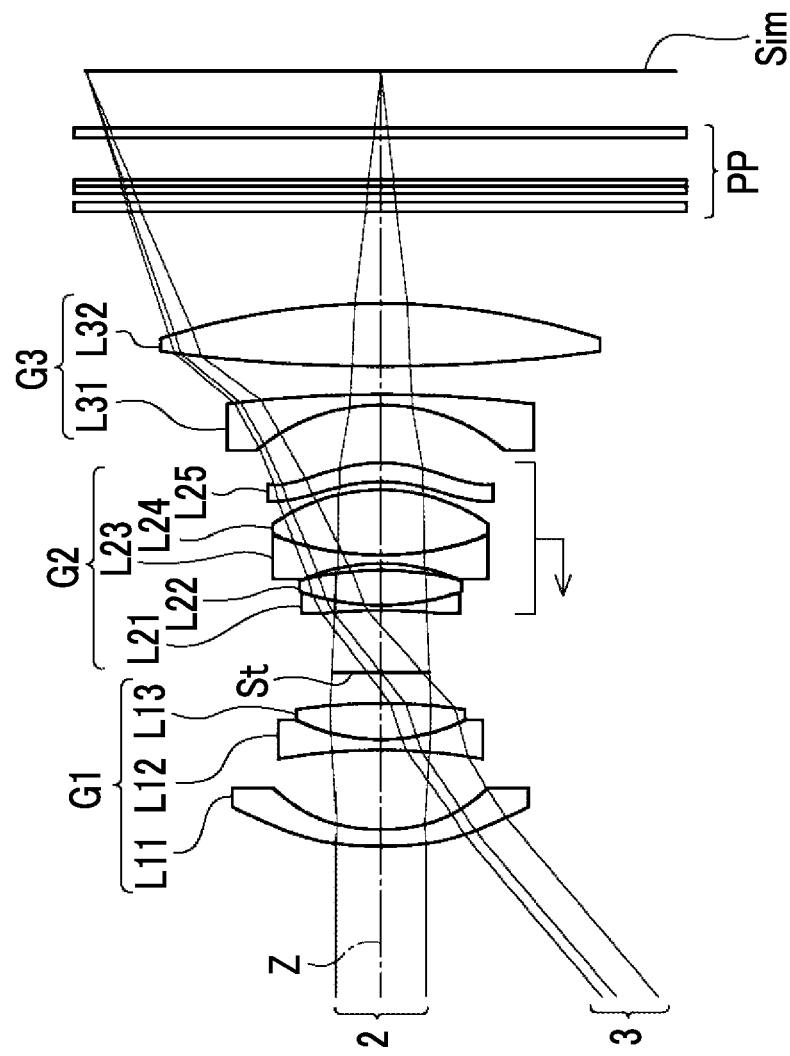
FIG. 7 is a cross-sectional view showing a configuration and rays of an imaging lens of Example 4.

FIG. 7 is a cross-sectional view showing a configuration and rays of the imaging lens of Example 4. The imaging lens of Example 4 consists of, in order from the object side to the image side, a first lens group G1 having a positive refractive power, an aperture stop St, a second lens group G2 having a positive refractive power, and a third lens group G3 having a negative refractive power. The first lens group G1 consists of three lenses L11 to L13 in order from the object side to the image side. The second lens group G2 consists of five lenses L21 to L25 in order from the object side to the image side. The third lens group G3 consists of two lenses L31 and L32, in order from the object side to the image side.

Figure 8:
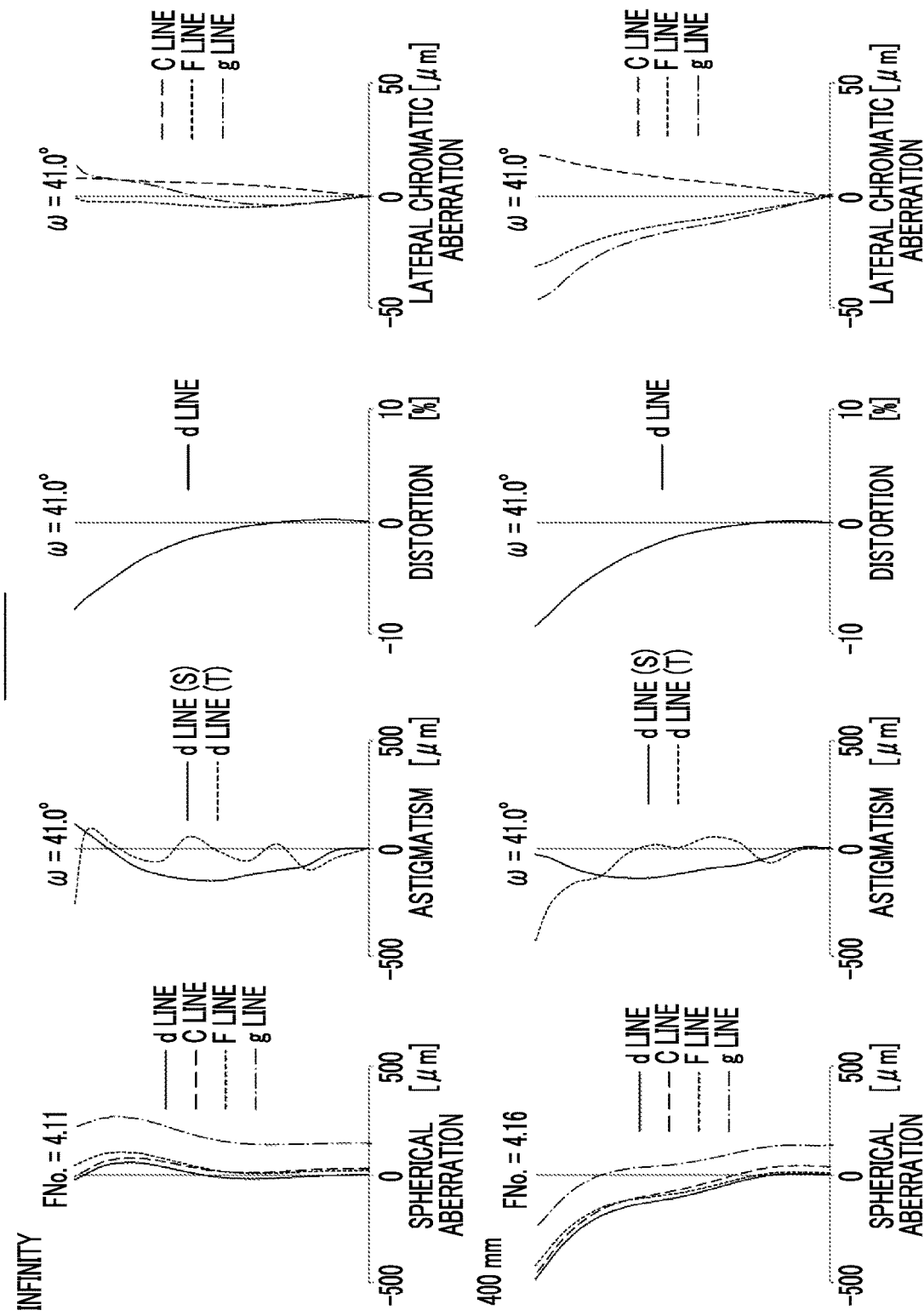
FIG. 8 is a diagram showing aberrations of the imaging lens of Example 4.

Regarding the imaging lens of Example 4, Table 10 shows basic lens data, Table 11 shows specification and variable surface distances, and Table 12 shows aspheric surface coefficients thereof, and FIG. 8 shows aberration diagrams. FIG. 8 shows aberration diagrams in a state where the object at infinity is in focus in the upper part, and shows aberration diagrams in a state where the object at the object distance of 400 mm (millimeter) is in focus in the lower part.

TABLE 10

| | | | Example 4 | | | |
|---|---|---|---|---|---|---|
| Sn | R | D | Nd | νd | θgF | Material |
| *1 | 49.99993 | 1.600 | 1.51742 | 52.43 | 0.55649 | S-NSL36.OHARA |
| *2 | 22.36296 | 7.578 | | | | |
| 3 | −58.46285 | 1.010 | 1.57501 | 41.50 | 0.57672 | S-TIL27.OHARA |
| 4 | 19.28420 | 3.451 | 1.88300 | 40.80 | 0.56557 | TAFD30.HOYA |
| 5 | −57.67722 | 2.950 | | | | |
| 6(St) | ∞ | DD[6] | | | | |
| 7 | −59.43953 | 0.510 | 1.51742 | 52.43 | 0.55649 | S-NSL36.OHARA |
| 8 | 24.46458 | 3.361 | 1.88300 | 39.22 | 0.57295 | H-ZLAF68N.CDGM |
| 9 | −32.34629 | 0.650 | | | | |
| 10 | −19.53860 | 0.810 | 1.74077 | 27.76 | 0.60777 | E-FD13.HOYA |
| 11 | 30.06008 | 6.112 | 1.62041 | 60.29 | 0.54266 | S-BSM16.OHARA |
| 12 | −18.78286 | 0.800 | | | | |
| *13 | −15.30009 | 1.800 | 1.80139 | 45.45 | 0.55814 | M-TAF31.HOYA |
| *14 | −14.28645 | DD[14] | | | | |
| 15 | −19.08460 | 1.000 | 1.77047 | 29.74 | 0.59514 | NBFD29.HOYA |
| 16 | −122.83559 | 2.695 | | | | |
| 17 | 160.84222 | 6.000 | 2.00069 | 25.46 | 0.61364 | TAFD40.HOYA |
| 18 | −70.59491 | 8.800 | | | | |
| 19 | ∞ | 0.900 | 1.51680 | 64.20 | 0.53430 | |
| 20 | ∞ | 0.820 | | | | |
| 21 | ∞ | 0.700 | 1.51680 | 64.20 | 0.53430 | |
| 22 | ∞ | 0.600 | 1.51350 | 77.00 | 0.52020 | |
| 23 | ∞ | 4.000 | | | | |
| 24 | ∞ | 1.000 | 1.51000 | 55.00 | 0.55105 | |
| 25 | ∞ | 5.395 | | | | |

TABLE 11

| | Example 4 | |
|---|---|---|
| Object Distance | Infinity | 400 mm |
| f | 35.949 | 34.626 |
| Bf | 21.128 | 18.055 |
| FNo. | 4.11 | 4.16 |
| 2ωmax(°) | 82.0 | 82.0 |
| DD[6] | 5.918 | 4.191 |
| DD[14] | 5.519 | 7.246 |

TABLE 12

| | | Example 4 | | |
|---|---|---|---|---|
| Sn | 1 | 2 | 13 | 14 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.0999062E−04 | 1.4192221E−04 | 5.4122167E−05 | 1.5298021E−04 |

TABLE 12-continued

| | Example 4 | | | |
|---|---|---|---|---|
| Sn | 1 | 2 | 13 | 14 |
| A5 | −2.7473829E−05 | 5.0844648E−05 | 5.1837317E−05 | −2.8693085E−05 |
| A6 | 3.1727260E−06 | −1.8623451E−05 | −1.4216216E−05 | 7.4732375E−06 |
| A7 | 4.8599971E−07 | 1.5011938E−06 | −3.8959374E−07 | 7.4716003E−07 |
| A8 | −1.9001292E−07 | 6.3937765E−07 | 8.0832489E−07 | −6.6889821E−07 |
| A9 | 2.9828494E−09 | −1.4457669E−07 | −6.6007194E−08 | 7.0312915E−08 |
| A10 | 3.2534144E−09 | −6.4134959E−09 | −1.6634399E−08 | 1.7918877E−08 |
| A11 | −1.6444086E−10 | 3.9091388E−09 | 2.2947320E−09 | −3.5602975E−09 |
| A12 | −2.8547286E−11 | −8.1862178E−11 | 1.4639356E−10 | −1.6801059E−10 |
| A13 | 1.9228545E−12 | −5.3208663E−11 | −3.1998566E−11 | 6.9632201E−11 |
| A14 | 1.3970454E−13 | 2.6059185E−12 | −2.3022186E−13 | −6.6217174E−13 |
| A15 | −1.0728799E−14 | 3.9696681E−13 | 1.9790695E−13 | −6.9114163E−13 |
| A16 | −3.7212134E−16 | −2.5731582E−14 | −3.3561948E−15 | 2.4986584E−14 |
| A17 | 2.9759734E−17 | −1.5498704E−15 | −3.2867307E−16 | 3.4636730E−15 |
| A18 | 4.6916729E−19 | 1.1648642E−16 | 2.9891045E−18 | −1.7867123E−16 |
| A19 | −3.2989206E−20 | 2.4803655E−18 | −9.5859101E−19 | −6.9499850E−18 |
| A20 | −1.7234047E−22 | −2.0473550E−19 | 8.0001532E−20 | 4.2783610E−19 |

Example 5

Figure 9:
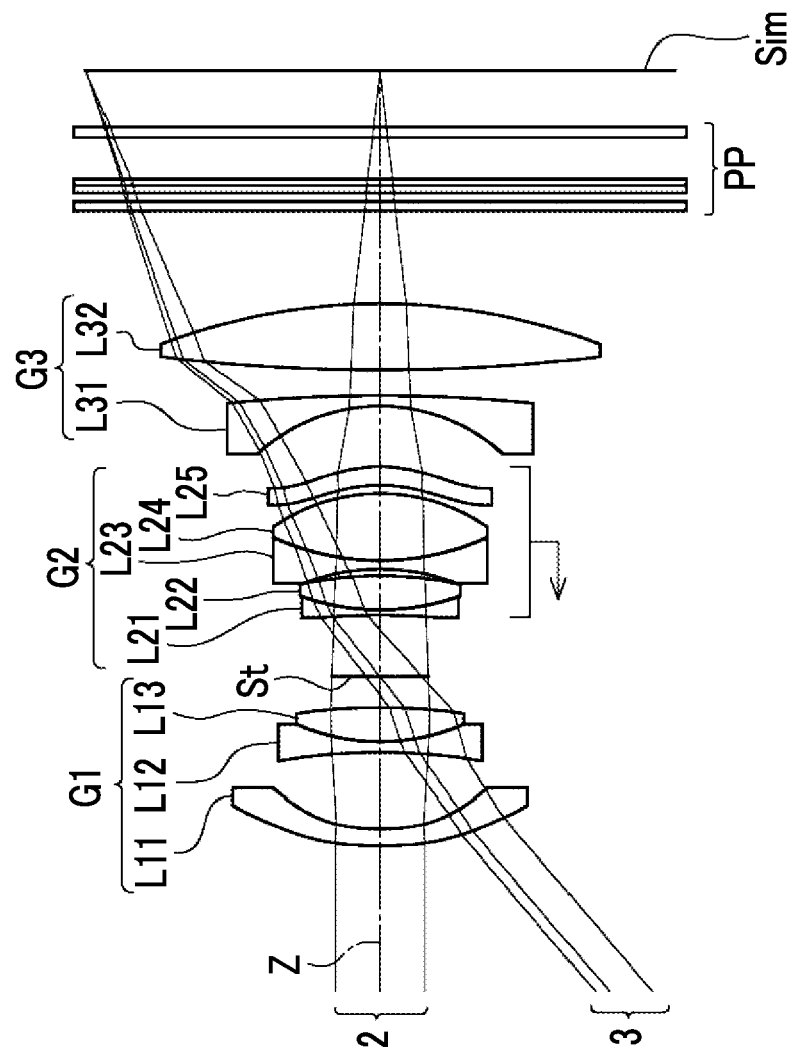
FIG. 9 is a cross-sectional view showing a configuration and rays of an imaging lens of Example 5.

FIG. 9 is a cross-sectional view showing a configuration and rays of the imaging lens of Example 5. The imaging lens of Example 5 consists of, in order from the object side to the image side, a first lens group G1 having a positive refractive power, an aperture stop St, a second lens group G2 having a positive refractive power, and a third lens group G3 having a negative refractive power. The first lens group G1 consists of three lenses L11 to L13 in order from the object side to the image side. The second lens group G2 consists of five lenses L21 to L25 in order from the object side to the image side. The third lens group G3 consists of two lenses L31 and L32, in order from the object side to the image side.

Figure 10:
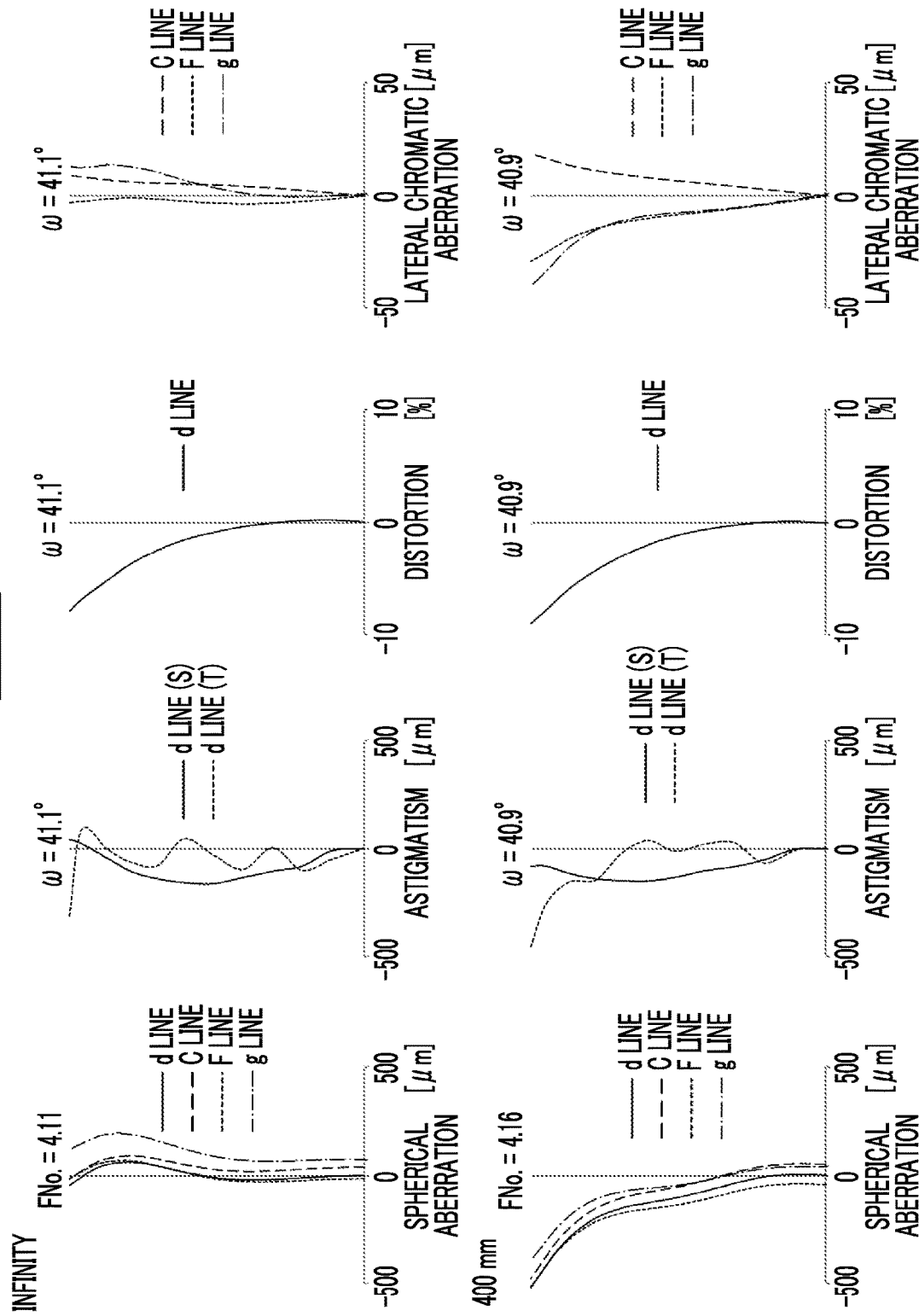
FIG. 10 is a diagram showing aberrations of the imaging lens of Example 5.

Regarding the imaging lens of Example 5, Table 13 shows basic lens data, Table 14 shows specification and variable surface distances, and Table 15 shows aspheric surface coefficients thereof, and FIG. 10 shows aberration diagrams.

FIG. 10 shows aberration diagrams in a state where the object at infinity is in focus in the upper part, and shows aberration diagrams in a state where the object at the object distance of 400 mm (millimeter) is in focus in the lower part.

TABLE 13

| | Example 5 | | | | | |
|---|---|---|---|---|---|---|
| Sn | R | D | Nd | νd | θgF | Material |
| *1 | 50.01787 | 1.600 | 1.51760 | 63.54 | 0.53369 | K-PBK40.SUMITA |
| *2 | 22.75246 | 7.266 | | | | |
| 3 | −60.67412 | 1.010 | 1.58144 | 40.75 | 0.57757 | S-TIL25.OHARA |
| 4 | 21.10337 | 3.264 | 1.88300 | 40.80 | 0.56557 | TAFD30.HOYA |
| 5 | −58.92870 | 2.950 | | | | |
| 6(St) | ∞ | DD[6] | | | | |
| 7 | −75.12002 | 0.510 | 1.51823 | 58.90 | 0.54567 | S-NSL3.OHARA |
| 8 | 23.62088 | 3.248 | 1.88300 | 40.76 | 0.56679 | S-LAH58.OHARA |
| 9 | −38.53773 | 0.650 | | | | |
| 10 | −21.49582 | 0.810 | 1.71736 | 29.52 | 0.60483 | S-TIH1.OHARA |
| 11 | 25.99923 | 6.398 | 1.61800 | 63.33 | 0.54414 | S-PHM52.OHARA |
| 12 | −18.96038 | 0.800 | | | | |
| *13 | −15.21758 | 1.800 | 1.80139 | 45.45 | 0.55814 | M-TAF31.HOYA |
| *14 | −14.28632 | DD[14] | | | | |
| 15 | −18.22828 | 1.000 | 1.74000 | 28.30 | 0.60790 | S-TIH3.OHARA |
| 16 | −154.87496 | 2.451 | | | | |
| 17 | 185.24806 | 6.330 | 2.00069 | 25.46 | 0.61364 | TAFD40.HOYA |
| 18 | −61.73385 | 8.800 | | | | |
| 19 | ∞ | 0.900 | 1.51680 | 64.20 | 0.53430 | |
| 20 | ∞ | 0.820 | | | | |
| 21 | ∞ | 0.700 | 1.51680 | 64.20 | 0.53430 | |
| 22 | ∞ | 0.600 | 1.51350 | 77.00 | 0.52020 | |
| 23 | ∞ | 4.000 | | | | |
| 24 | ∞ | 1.000 | 1.51000 | 55.00 | 0.55105 | |
| 25 | ∞ | 5.411 | | | | |

TABLE 14

| | Example 5 | |
|---|---|---|
| Object Distance | Infinity | 400 mm |
| f | 35.950 | 34.702 |
| Bf | 21.145 | 18.057 |
| FNo. | 4.11 | 4.16 |
| 2ωmax(°) | 82.2 | 81.8 |
| DD[6] | 5.888 | 4.224 |
| DD[14] | 5.786 | 7.450 |

TABLE 15

Example 5

| Sn | 1 | 2 | 13 | 14 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 2.2374349E−04 | 1.4975617E−04 | 6.5638650E−05 | 1.6124693E−04 |
| A5 | −3.4501536E−05 | 5.0201891E−05 | 4.5652609E−05 | −3.3975429E−05 |
| A6 | 4.3234994E−06 | −2.0178055E−05 | −1.3582743E−05 | 8.6390652E−06 |
| A7 | 6.1179190E−07 | 1.9533273E−06 | 2.9604040E−08 | 8.1547778E−07 |
| A8 | −2.3742041E−07 | 6.8391369E−07 | 6.9287336E−07 | −7.4396116E−07 |
| A9 | 3.1464875E−09 | −1.7151938E−07 | −7.3258786E−08 | 7.7247224E−08 |
| A10 | 4.0670067E−09 | −5.9181785E−09 | −1.1342064E−08 | 1.9572770E−08 |
| A11 | −1.9274210E−10 | 4.5772780E−09 | 2.1031774E−09 | −3.8507376E−09 |
| A12 | −3.6315756E−11 | −1.2088424E−10 | 3.2108979E−11 | −1.8158845E−10 |
| A13 | 2.2760712E−12 | −6.1888863E−11 | −2.1965182E−11 | 7.4596261E−11 |
| A14 | 1.8459980E−13 | 3.2939326E−12 | 9.5643551E−13 | −7.0553697E−13 |
| A15 | −1.2746692E−14 | 4.5920743E−13 | 3.1112416E−14 | −7.3503751E−13 |
| A16 | −5.3150816E−16 | −3.1511204E−14 | −7.3131880E−15 | 2.6544470E−14 |
| A17 | 3.5441018E−17 | −1.7835706E−15 | 9.2170881E−16 | 3.6617383E−15 |
| A18 | 7.9651809E−19 | 1.4058482E−16 | −1.7767576E−17 | −1.8883113E−16 |
| A19 | −3.9371197E−20 | 2.8397477E−18 | −4.5320398E−18 | −7.3113230E−18 |
| A20 | −4.7519002E−22 | −2.4486315E−19 | 2.1817791E−19 | 4.5013629E−19 |

Example 6

Figure 11:
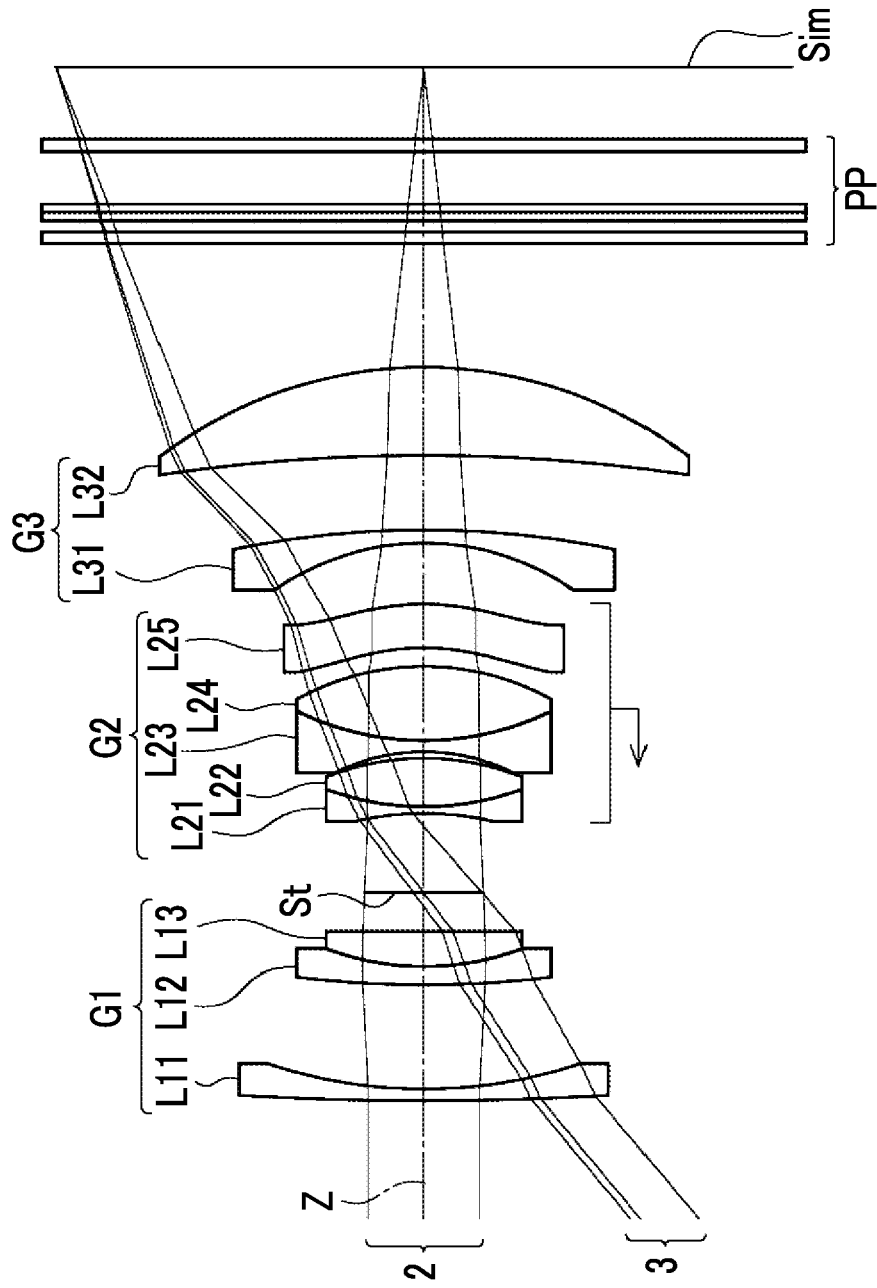
FIG. 11 is a cross-sectional view showing a configuration and rays of an imaging lens of Example 6.

FIG. 11 is a cross-sectional view showing a configuration and rays of the imaging lens of Example 6. The imaging lens of Example 6 consists of, in order from the object side to the image side, a first lens group G1 having a positive refractive power, an aperture stop St, a second lens group G2 having a positive refractive power, and a third lens group G3 having a positive refractive power. The first lens group G1 consists of three lenses L11 to L13 in order from the object side to the image side. The second lens group G2 consists of five lenses L21 to L25 in order from the object side to the image side. The third lens group G3 consists of two lenses L31 and L32, in order from the object side to the image side.

Figure 12:
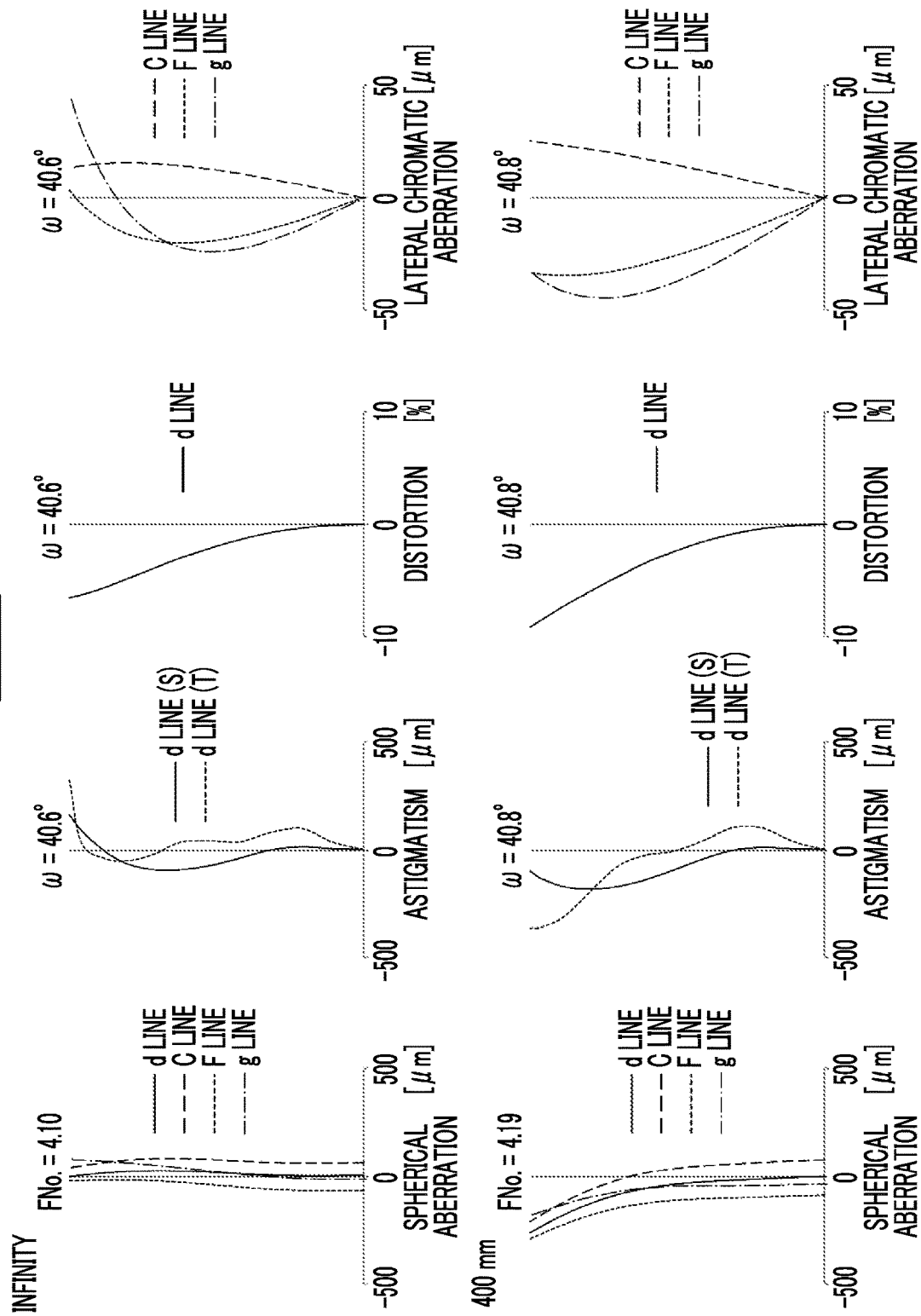
FIG. 12 is a diagram showing aberrations of the imaging lens of Example 6.

Regarding the imaging lens of Example 6, Table 16 shows basic lens data, Table 17 shows specification and variable surface distances, and Table 18 shows aspheric surface coefficients thereof, and FIG. 12 shows aberration diagrams. FIG. 12 shows aberration diagrams in a state where the object at infinity is in focus in the upper part, and shows aberration diagrams in a state where the object at the object distance of 400 mm (millimeter) is in focus in the lower part.

TABLE 16

Example 6

| Sn | R | D | Nd | vd | θgF | Material |
|---|---|---|---|---|---|---|
| 1 | 250.56377 | 0.900 | 1.59282 | 68.62 | 0.54414 | FCD515.HOYA |
| 2 | 39.94603 | 8.000 | | | | |
| 3 | 87.91370 | 1.310 | 1.59551 | 39.24 | 0.58043 | S-TIM8.OHARA |
| 4 | 22.11687 | 2.700 | 1.88300 | 40.80 | 0.56557 | TAFD30.HOYA |
| 5 | −1580.67256 | 2.950 | | | | |
| 6(St) | ∞ | DD[6] | | | | |
| 7 | −24.41885 | 0.510 | 1.53172 | 48.84 | 0.56309 | S-TIL6.OHARA |
| 8 | 22.78484 | 3.725 | 1.88100 | 40.14 | 0.57010 | TAFD33.HOYA |
| 9 | −21.52847 | 0.500 | | | | |
| 10 | −15.97351 | 0.860 | 1.68893 | 31.07 | 0.60041 | S-TIM28.OHARA |
| 11 | 23.48310 | 5.668 | 1.72916 | 54.09 | 0.54490 | S-LAL19.OHARA |
| 12 | −21.16307 | 1.425 | | | | |
| *13 | −18.26069 | 3.338 | 1.77250 | 49.50 | 0.55193 | M-TAF105.HOYA |
| *14 | −19.44901 | DD[14] | | | | |
| 15 | −20.98862 | 1.000 | 1.72047 | 34.71 | 0.58350 | S-NBH8.OHARA |
| 16 | −76.23784 | 5.697 | | | | |
| 17 | −145.35396 | 6.744 | 1.90043 | 37.37 | 0.57668 | TAFD37A.HOYA |
| 18 | −35.00906 | 9.410 | | | | |
| 19 | ∞ | 0.900 | 1.51680 | 64.20 | 0.53430 | |
| 20 | ∞ | 0.820 | | | | |
| 21 | ∞ | 0.700 | 1.51680 | 64.20 | 0.53430 | |
| 22 | ∞ | 0.600 | 1.51350 | 77.00 | 0.52020 | |
| 23 | ∞ | 4.000 | | | | |
| 24 | ∞ | 1.000 | 1.51000 | 55.00 | 0.55105 | |
| 25 | ∞ | 5.497 | | | | |

TABLE 17

Example 6

| Object Distance | Infinity | 400 mm |
|---|---|---|
| f | 36.045 | 35.513 |
| Bf | 21.841 | 18.662 |
| FNo. | 4.10 | 4.19 |
| 2ωmax(°) | 81.2 | 81.6 |

TABLE 17-continued

Example 6

| Object Distance | Infinity | 400 mm |
|---|---|---|
| DD[6] | 6.068 | 3.877 |
| DD[14] | 4.693 | 6.884 |

TABLE 18

Example 6

| Sn | 13 | 14 |
|---|---|---|
| KA | 1.0000000E+00 | 1.0000000E+00 |
| A3 | 0.0000000E+00 | 0.0000000E+00 |
| A4 | 9.1272949E−05 | 8.9835214E−05 |
| A5 | −8.3594616E−06 | −3.2853942E−06 |
| A6 | 1.8272657E−06 | 3.1360222E−07 |
| A7 | −2.5037120E−08 | 7.0031975E−08 |
| A8 | −1.0535938E−08 | 5.1917233E−10 |
| A9 | 2.8801111E−10 | −4.6813188E−10 |
| A10 | 7.4076321E−11 | −3.5781489E−11 |
| A11 | 2.1201288E−12 | 2.0152910E−12 |
| A12 | −1.7045693E−12 | 2.1927496E−13 |
| A13 | 5.5635889E−15 | 5.7705323E−15 |
| A14 | 1.6168490E−14 | 9.1795658E−16 |

TABLE 18-continued

Example 6

| Sn | 13 | 14 |
|---|---|---|
| A15 | 1.0517148E−16 | −1.6308789E−16 |
| A16 | −1.0689216E−16 | −1.2699045E−17 |
| A17 | −3.1640418E−18 | −2.6267555E−20 |
| A18 | 7.2820091E−19 | −4.8482345E−20 |
| A19 | −8.3410298E−21 | 2.6088371E−20 |
| A20 | −7.5094115E−22 | −1.2550831E−21 |

Example 7

Figure 13:
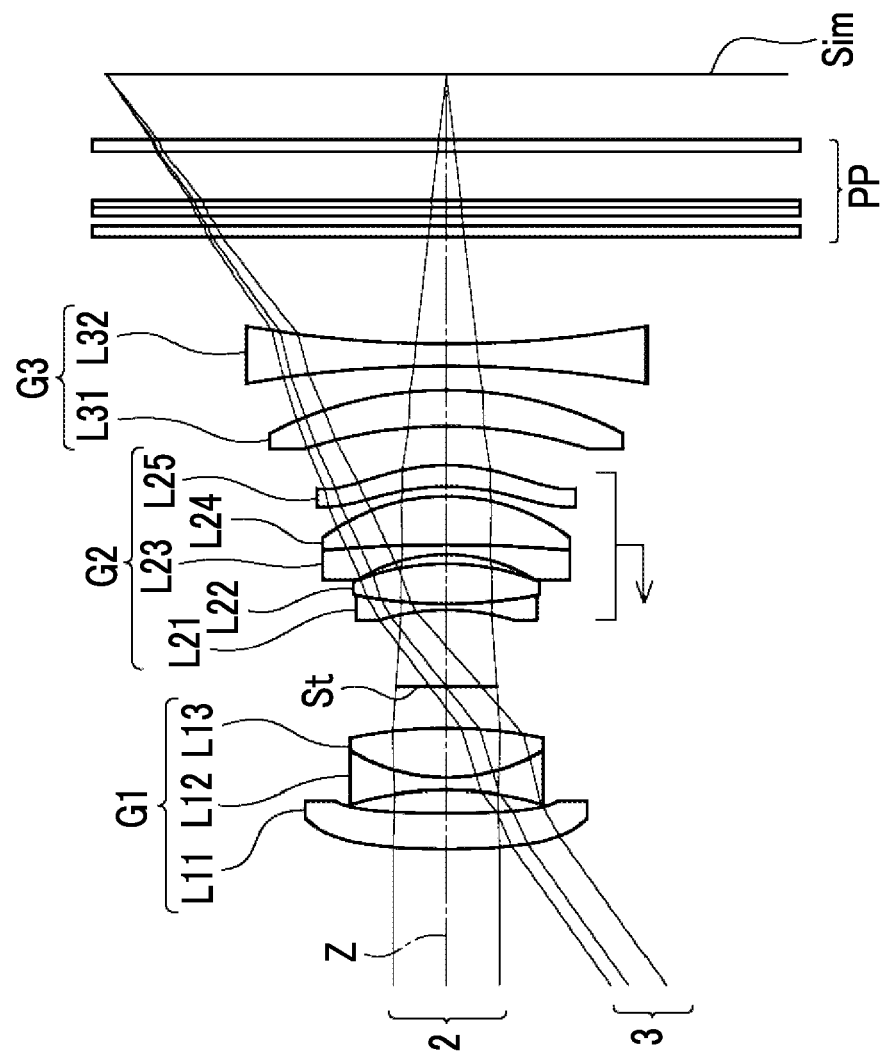
FIG. 13 is a cross-sectional view showing a configuration and rays of an imaging lens of Example 7.

FIG. 13 is a cross-sectional view showing a configuration and rays of the imaging lens of Example 7. The imaging lens of Example 7 consists of, in order from the object side to the image side, a first lens group G1 having a positive refractive power, an aperture stop St, a second lens group G2 having a positive refractive power, and a third lens group G3 having a negative refractive power. The first lens group G1 consists of three lenses L11 to L13 in order from the object side to the image side. The second lens group G2 consists of five lenses L21 to L25 in order from the object side to the image side. The third lens group G3 consists of two lenses L31 and L32, in order from the object side to the image side.

Figure 14:
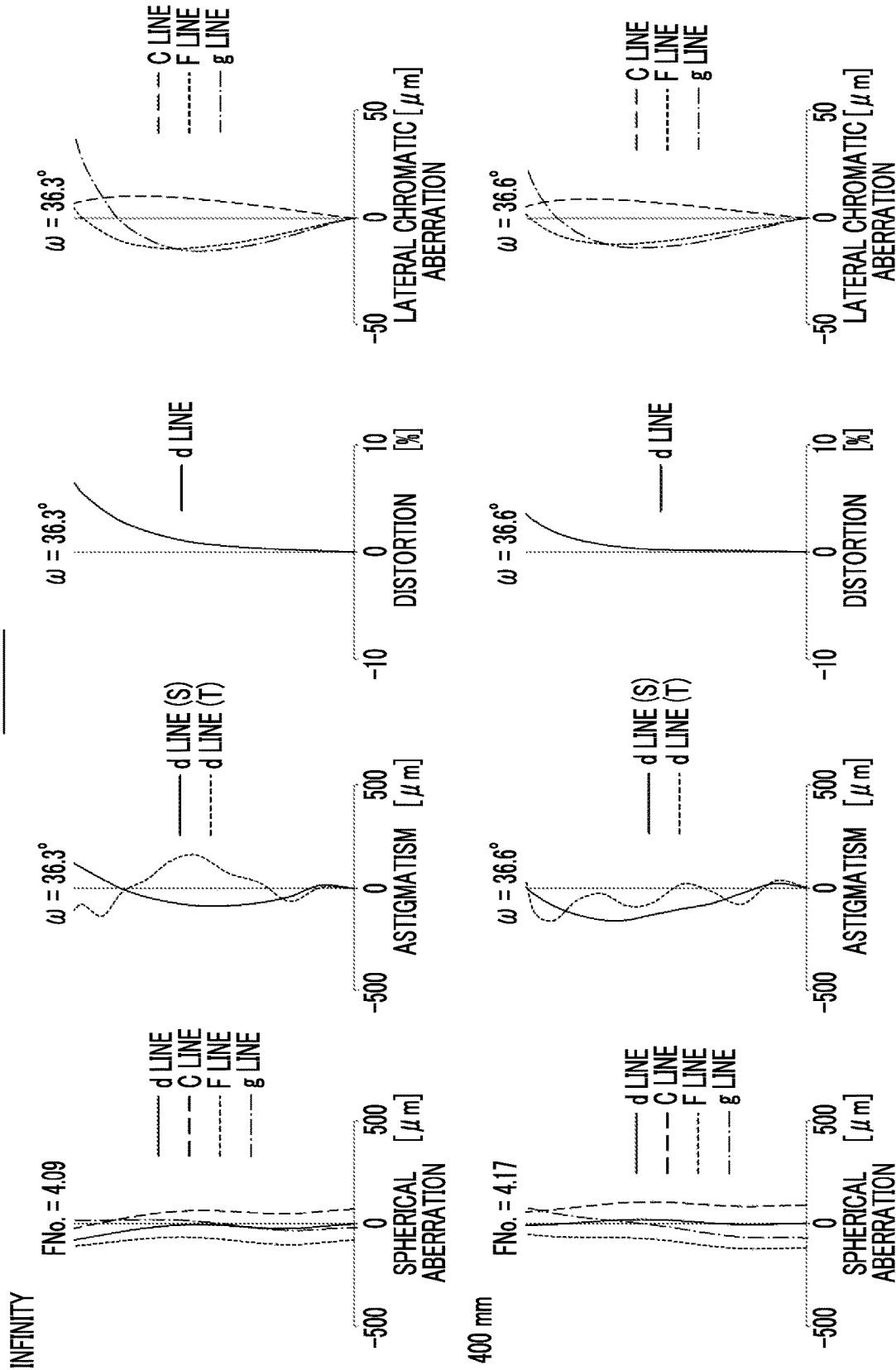
FIG. 14 is a diagram showing aberrations of the imaging lens of Example 7.

Regarding the imaging lens of Example 7, Table 19 shows basic lens data, Table 20 shows specification and variable surface distances, and Table 21 shows aspheric surface coefficients thereof, and FIG. 14 shows aberration diagrams. FIG. 14 shows aberration diagrams in a state where the object at infinity is in focus in the upper part, and shows aberration diagrams in a state where the object at the object distance of 400 mm (millimeter) is in focus in the lower part.

TABLE 19

Example 7

| Sn | R | D | Nd | vd | θgF | Material |
|---|---|---|---|---|---|---|
| *1 | 74.86804 | 3.000 | 1.68893 | 31.16 | 0.60382 | MC-FD80.HOYA |
| *2 | 153.84549 | 1.860 | | | | |
| 3 | −29.19165 | 1.010 | 1.68960 | 31.14 | 0.60319 | E-FD80.HOYA |
| 4 | 16.21723 | 4.072 | 1.89190 | 37.13 | 0.57813 | S-LAH92.OHARA |
| 5 | −41.97201 | 3.419 | | | | |
| 6(St) | ∞ | DD[6] | | | | |
| 7 | −20.18566 | 0.510 | 1.51680 | 64.20 | 0.53430 | BSC7.HOYA |
| 8 | 41.78736 | 3.316 | 2.00100 | 29.13 | 0.59952 | TAFD55.HOYA |
| 9 | −21.62527 | 0.763 | | | | |
| 10 | −14.49034 | 0.810 | 1.89286 | 20.36 | 0.63944 | S-NPH4.OHARA |
| 11 | −117.23082 | 4.010 | 1.75500 | 52.32 | 0.54757 | S-LAH97.OHARA |
| 12 | −17.85566 | 0.800 | | | | |
| *13 | −19.30623 | 1.800 | 1.80139 | 45.45 | 0.55814 | M-TAF31.HOYA |
| *14 | −16.66196 | DD[14] | | | | |
| 15 | −40.00000 | 3.000 | 2.00100 | 29.13 | 0.59952 | TAFD55-W.HOYA |
| 16 | −33.32334 | 2.000 | | | | |
| 17 | −100.03883 | 1.830 | 1.83400 | 37.34 | 0.57908 | NBFD10.HOYA |
| 18 | 100.09741 | 8.800 | | | | |
| 19 | ∞ | 0.900 | 1.51680 | 64.20 | 0.53430 | |
| 20 | ∞ | 0.820 | | | | |
| 21 | ∞ | 0.700 | 1.51680 | 64.20 | 0.53430 | |
| 22 | ∞ | 0.600 | 1.51350 | 77.00 | 0.52020 | |
| 23 | ∞ | 4.000 | | | | |
| 24 | ∞ | 1.000 | 1.51000 | 55.00 | 0.55105 | |
| 25 | ∞ | 5.452 | | | | |

TABLE 20

Example 7

| Object Distance | Infinity | 400 mm |
|---|---|---|
| f | 36.930 | 34.826 |
| Bf | 21.186 | 17.997 |
| FNo. | 4.09 | 4.17 |
| 2ωmax(°) | 72.6 | 73.2 |
| DD[6] | 6.375 | 3.809 |
| DD[14] | 3.200 | 5.766 |

TABLE 21

| | Example 7 | | | |
|---|---|---|---|---|
| Sn | 1 | 2 | 13 | 14 |
| KA | 1.0000000E+00 | 1.0000000E+00 | 1.0000000E+00 | 1.0000000E+00 |
| A3 | 2.6316398E−19 | 3.8549411E−19 | −2.2204460E−19 | 3.3365080E−19 |
| A4 | 3.0240589E−05 | −3.5425844E−06 | 1.4130437E−04 | 2.0592837E−04 |
| A5 | 1.1269398E−05 | 5.0755326E−05 | −5.7050819E−05 | −9.8502688E−05 |
| A6 | −4.0210575E−06 | −1.5744332E−05 | −1.2928160E−06 | 1.8354871E−05 |
| A7 | 4.5562139E−07 | 9.5875534E−07 | 6.5602234E−06 | 2.2541664E−06 |
| A8 | 5.5290028E−08 | 5.2969172E−07 | −9.4078194E−07 | −1.0904248E−06 |
| A9 | −1.5318852E−08 | −9.7339087E−08 | −2.2301950E−07 | 3.9678002E−08 |
| A10 | 4.6403527E−11 | −5.2471699E−09 | 6.0086743E−08 | 2.4866054E−08 |
| A11 | 2.1276716E−10 | 2.4495662E−09 | 1.4262077E−09 | −2.4277604E−09 |
| A12 | −8.1149500E−12 | −4.6855350E−11 | −1.4687295E−09 | −2.6344050E−10 |
| A13 | −1.6291961E−12 | −3.0687303E−11 | 6.5799712E−11 | 4.2730775E−11 |
| A14 | 8.7621071E−14 | 1.5550773E−12 | 1.6720696E−11 | 9.5313649E−13 |
| A15 | 7.2343000E−15 | 2.1063077E−13 | −1.5071571E−12 | −3.7020625E−13 |
| A16 | −4.2896821E−16 | −1.4613101E−14 | −7.4361547E−14 | 5.1130555E−15 |
| A17 | −1.7558793E−17 | −7.5695008E−16 | 1.2313001E−14 | 1.6078307E−15 |
| A18 | 1.0083676E−18 | 6.2811756E−17 | −8.7510339E−17 | −5.4275846E−17 |
| A19 | 1.8051701E−20 | 1.1135563E−18 | −3.6223383E−17 | −2.7721816E−18 |
| A20 | −9.0864012E−22 | −1.0578392E−19 | 1.2259799E−18 | 1.2821233E−19 |

Table 22 and Table 23 each show the corresponding values of Conditional Expressions (1) to (23) of the imaging lenses of Examples 1 to 7. In Examples 1 to 7, the d line is set as the reference wavelength. Tables 22 and 23 show values based on the d line except for the partial dispersion ratio.

TABLE 22

| Expression Number | | Example 1 | Example 2 | Example 3 | Example 4 |
|---|---|---|---|---|---|
| (1) | f2/f1 | −0.120 | 0.277 | 0.419 | 0.369 |
| (2) | (R2rB − R2rA)/(R2rB + R2rA) | 0.076 | 0.034 | 0.024 | −0.034 |
| (3) | f2/f2R | −0.126 | −0.018 | 0.033 | 0.216 |
| (4) | f/f1 | −0.153 | 0.316 | 0.451 | 0.408 |
| (5) | f/f2 | 1.281 | 1.140 | 1.075 | 1.106 |
| (6) | f/f3 | −0.311 | −0.354 | −0.208 | −0.362 |
| (7) | f3p/f | 1.567 | 1.406 | 0.988 | 1.382 |
| (8) | T3/{f × tan(ωmax)} | 0.364 | 0.317 | 0.372 | 0.310 |
| (9) | (R3nB − R3nA)/(R3nB + R3nA) | 1.221 | 1.057 | 0.984 | 0.731 |
| (10) | T3/Bf | 0.521 | 0.476 | 0.505 | 0.459 |
| (11) | −R2sB/S2sB | 1.299 | 0.944 | 1.087 | 1.082 |
| (12) | ν1n − ν1p | 17.515 | 8.030 | 7.550 | 6.165 |
| (13) | θ1n − θ1p | −0.02328 | 0.00213 | −0.00313 | 0.00104 |
| (14) | N3p | 2.00100 | 2.00100 | 2.00069 | 2.00069 |
| (15) | N3n | 1.78472 | 1.78880 | 1.89286 | 1.77047 |
| (16) | N1p | 1.87070 | 1.74100 | 1.88300 | 1.88300 |
| (17) | N1n | 1.51688 | 1.53885 | 1.62047 | 1.54622 |
| (18) | ν2Fp | 60.380 | 49.755 | 41.935 | 49.755 |
| (19) | ν2Fn | 38.230 | 39.825 | 41.750 | 40.095 |
| (20) | fL2/fL1 | 0.431 | 0.225 | 0.644 | 0.315 |
| (21) | (1/f3n − 1/f3p) × f | −1.709 | −1.904 | −2.492 | −1.944 |
| (22) | (1 − β2²) × β3² | 2.016 | 1.859 | 1.714 | 1.817 |
| (23) | β3² | 2.039 | 1.959 | 1.917 | 1.983 |

TABLE 23

| Expression Number | | Example 5 | Example 6 | Example 7 |
|---|---|---|---|---|
| (1) | f2/f1 | 0.302 | 0.359 | 0.567 |
| (2) | (R2rB − R2rA)/(R2rB + R2rA) | −0.032 | 0.032 | −0.074 |
| (3) | f2/f2R | 0.199 | 0.021 | 0.319 |
| (4) | f/f1 | 0.347 | 0.358 | 0.564 |
| (5) | f/f2 | 1.151 | 0.996 | 0.995 |
| (6) | f/f3 | −0.366 | 0.032 | −0.405 |
| (7) | f3p/f | 1.304 | 1.381 | 4.409 |
| (8) | T3/{f × tan(ωmax)} | 0.312 | 0.435 | 0.255 |
| (9) | (R3nB − R3nA)/(R3nB + R3nA) | 0.789 | 0.568 | 3416.460 |
| (10) | T3/Bf | 0.463 | 0.615 | 0.322 |
| (11) | −R2sB/S2sB | 1.083 | 1.221 | 1.131 |
| (12) | ν1n − ν1p | 11.345 | 13.130 | −3.005 |

TABLE 23-continued

| Expression Number | | Example 5 | Example 6 | Example 7 |
|---|---|---|---|---|
| (13) | θ1n − θ1p | −0.00994 | −0.00329 | 0.01222 |
| (14) | N3p | 2.00069 | 1.90043 | 2.00100 |
| (15) | N3n | 1.74000 | 1.72047 | 1.83400 |
| (16) | N1p | 1.88300 | 1.88300 | 1.79042 |
| (17) | N1n | 1.54952 | 1.59417 | 1.68960 |
| (18) | ν2Fp | 52.045 | 47.115 | 40.725 |
| (19) | ν2Fn | 44.210 | 39.955 | 42.280 |
| (20) | fL2/fL1 | 0.326 | 0.623 | −0.072 |
| (21) | (1/f3n − 1/f3p) × f | −2.051 | −1.614 | −0.845 |
| (22) | $(1 - \beta2^2) \times \beta3^2$ | 1.896 | 1.446 | 1.269 |
| (23) | $\beta3^2$ | 2.016 | 1.574 | 1.588 |

As can be seen from the above data, the imaging lenses of Examples 1 to 7 each are configured to have a short total length of the lens system with respect to the image size and have a small size. Further, in the imaging lenses of Examples 1 to 7, various aberrations are satisfactorily corrected and high optical performance is achieved.

Figure 15:
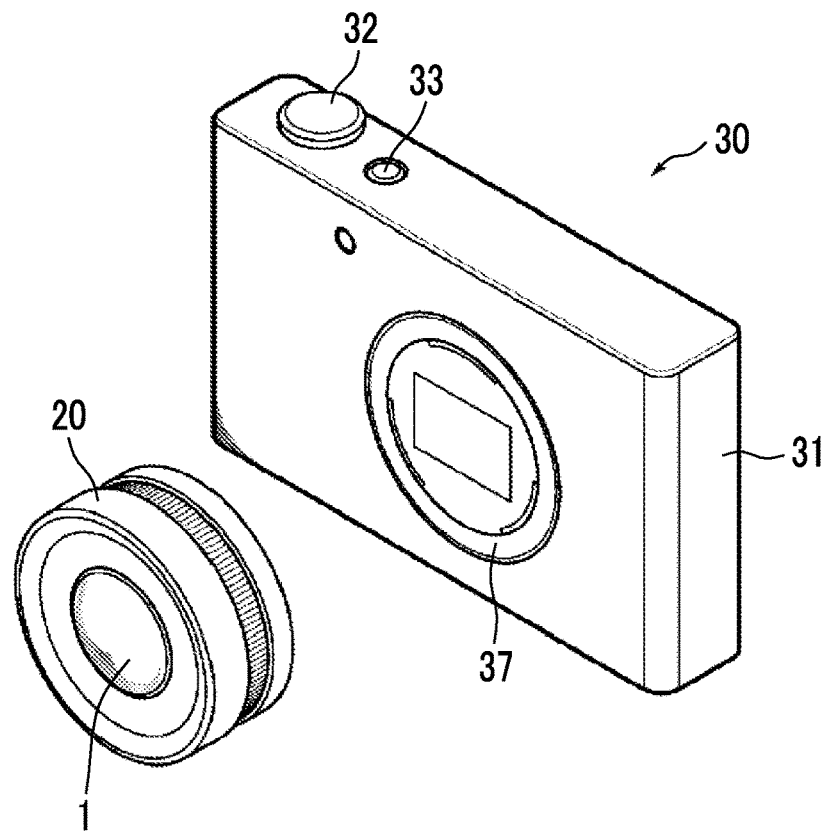
FIG. 15 is a perspective view of the front side of an imaging apparatus according to an embodiment of the present disclosure.
Figure 16:
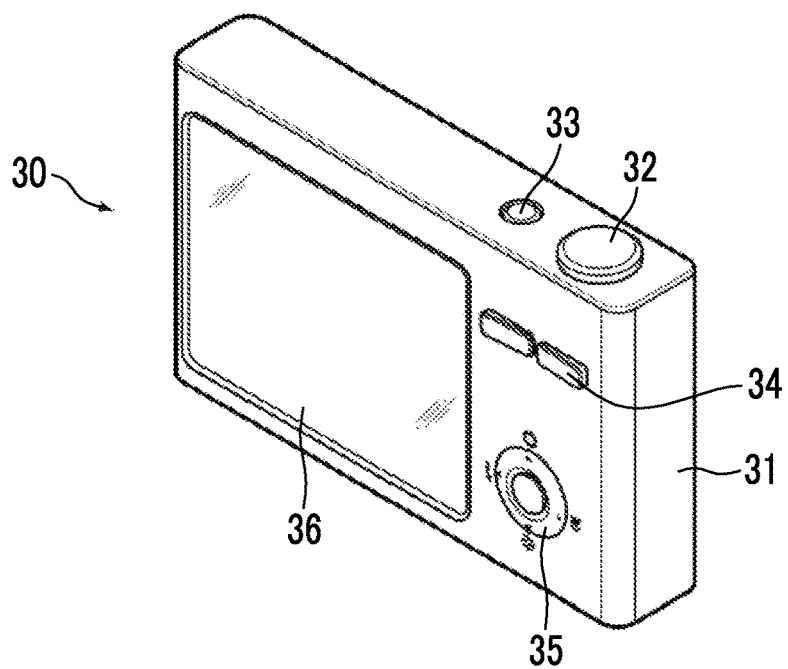
FIG. 16 is a perspective view of the rear side of an imaging apparatus according to an embodiment of the present disclosure.

Next, an imaging apparatus according to an embodiment of the present disclosure will be described. FIGS. 15 and 16 are external views of a camera 30 which is the imaging apparatus according to the embodiment of the present disclosure. FIG. 15 is a perspective view of the camera 30 viewed from the front side, and FIG. 16 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the radius of curvature, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side: a first lens group; a stop; a second lens group having a positive refractive power; and a third lens group,
   wherein during focusing, at least the second lens group moves along an optical axis, and the third lens group remains stationary with respect to an image plane,
   the second lens group includes at least two negative lenses,
   the third lens group consists of one negative lens and one positive lens, and
   the second lens group consists of, in order from the object side to the image side, two sets of cemented lenses and a meniscus lens having a surface concave toward the object side.

2. The imaging lens according to claim 1, wherein assuming that
   a focal length of the first lens group is f1, and
   a focal length of the second lens group is f2,
   Conditional Expression (1) is satisfied, which is represented by $$-0.5 < f2/f1 < 1 \tag{1}$$

3. The imaging lens according to claim 1,
   wherein the second lens group includes at least two positive lenses, and
   wherein a meniscus lens having a surface concave toward the object side is disposed at a position closest to the image side in the second lens group.

4. The imaging lens according to claim 1, wherein assuming that
   a paraxial radius of curvature of an object side surface of a lens closest to the image side in the second lens group is R2rA, and
   a paraxial radius of curvature of an image side surface of the lens closest to the image side in the second lens group is R2rB,
   Conditional Expression (2) is satisfied, which is represented by $$-0.3 < (R2rB - R2rA)/(R2rB + R2rA) < 0.3 \tag{2}$$

5. The imaging lens according to claim 1, wherein assuming that
   a focal length of the second lens group is f2, and
   a focal length of a lens closest to the image side in the second lens group is f2R,
   Conditional Expression (3) is satisfied, which is represented by $$-0.4 < f2/f2R < 0.6 \tag{3}$$

6. The imaging lens according to claim 1, wherein the first lens group includes at least one negative lens and at least one positive lens.

7. An imaging lens consisting of, in order from an object side to an image side: a first lens group; a stop; a second lens group having a positive refractive power; and a third lens group, wherein during focusing, at least the second lens group moves along an optical axis, and the third lens group remains stationary with respect to an image plane, the second lens group includes at least two negative lenses, the third lens group consists of one negative lens and one positive lens, and the first lens group consists of, in order from the object side to the image side, two negative lenses and one positive lens.

8. The imaging lens according to claim 1, wherein the negative lens of the third lens group has an absolute value of a radius of curvature of an object side surface smaller than an absolute value of a radius of curvature of an image side surface.

9. The imaging lens according to claim 1, wherein the third lens group includes the negative lens and the positive lens arranged in order from the object side to the image side.

10. The imaging lens according to claim 1, wherein assuming that a focal length of the imaging lens in a state where an object at infinity is in focus is f, and a focal length of the first lens group is f1, Conditional Expression (4) is satisfied, which is represented by $$-0.6 < f/f1 < 1.5 \qquad (4).$$

11. The imaging lens according to claim 1, wherein assuming that a focal length of the imaging lens in a state where an object at infinity is in focus is f, and a focal length of the second lens group is f2, Conditional Expression (5) is satisfied, which is represented by $$0.6 < f/f2 < 1.8 \qquad (5).$$

12. The imaging lens according to claim 1, wherein assuming that a focal length of the imaging lens in a state where an object at infinity is in focus is f, and a focal length of the third lens group is f3, Conditional Expression (6) is satisfied, which is represented by $$-0.8 < f/f3 < 0.4 \qquad (6).$$

13. The imaging lens according to claim 1, wherein assuming that a focal length of the positive lens of the third lens group is f3p, and a focal length of the imaging lens in a state where an object at infinity is in focus is f, Conditional Expression (7) is satisfied, which is represented by $$0.5 < f3p/f < 3 \qquad (7).$$

14. The imaging lens according to claim 1, wherein assuming that a maximum half angle of view of the imaging lens in a state where an object at infinity is in focus is ωmax, a distance on the optical axis from a lens surface closest to the object side in the third lens group to a lens surface closest to the image side in the third lens group is T3, and a focal length of the imaging lens in a state where an object at infinity is in focus is f, ωmax is 30 degrees or more, Conditional Expression (8) is satisfied, which is represented by $$0.2 < T3/\{f \times \tan(\omega\ max)\} < 0.6 \qquad (8).$$

15. The imaging lens according to claim 1, wherein assuming that a paraxial radius of curvature of an object side surface of the negative lens of the third lens group is R3 nA, and a paraxial radius of curvature of an image side surface of the negative lens of the third lens group is R3nB, Conditional Expression (9) is satisfied, which is represented by $$0.2 < (R3nB - R3nA)/(R3nB + R3nA) < 2 \qquad (9).$$

16. The imaging lens according to claim 2, wherein Conditional Expression (1-1) is satisfied, which is represented by $$-0.3 < f2/f1 < 0.9 \qquad (1\text{-}1).$$

17. The imaging lens according to claim 4, wherein Conditional Expression (2-1) is satisfied, which is represented by $$-0.15 < (R2rB - R2rA)/(R2rB + R2rA) < 0.15 \qquad (2\text{-}1).$$

18. The imaging lens according to claim 5, wherein Conditional Expression (3-1) is satisfied, which is represented by $$-0.3 < f2/f2R < 0.5 \qquad (3\text{-}1).$$

19. An imaging apparatus comprising the imaging lens according to claim 1.

20. An imaging apparatus comprising the imaging lens according to claim 7.

* * * * *